(12) United States Patent
Bandhauer et al.

(10) Patent No.: US 11,466,907 B2
(45) Date of Patent: Oct. 11, 2022

(54) ULTRA EFFICIENT TURBO-COMPRESSION COOLING SYSTEMS

(71) Applicant: Colorado State University Research Foundation, Fort Collins, CO (US)

(72) Inventors: Todd M. Bandhauer, Fort Collins, CO (US); Derek N. Young, Fort Collins, CO (US); Shane D. Garland, Fort Collins, CO (US); Alex M. Grauberger, Fort Collins, CO (US); John R. Simon, III, Fort Collins, CO (US); Nickolas R. Roberts, Fort Collins, CO (US); Samuel Colosimo, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 17/104,479

(22) Filed: Nov. 25, 2020

(65) Prior Publication Data
US 2021/0156597 A1    May 27, 2021

Related U.S. Application Data

(60) Provisional application No. 62/941,570, filed on Nov. 27, 2019.

(51) Int. Cl.
*F25B 27/02* (2006.01)
*F25B 9/00* (2006.01)
(Continued)

(52) U.S. Cl.
CPC ............... *F25B 27/02* (2013.01); *F01K 7/16* (2013.01); *F01K 11/02* (2013.01); *F01K 17/04* (2013.01);
(Continued)

(58) Field of Classification Search
CPC .......... F25B 27/02; F25B 9/008; F25B 11/02; F25B 39/00; F25B 41/31; F25B 2327/00;
(Continued)

(56) References Cited

U.S. PATENT DOCUMENTS 3,817,046 A * 6/1974 Aoki ...................... F25J 1/0022
                                                        62/612
4,361,015 A  11/1982 Apte
(Continued)

FOREIGN PATENT DOCUMENTS

EP          3199890      *  2/2017

OTHER PUBLICATIONS

International Search Report and Written Opinion, PCT/US2020/062222, dated Aug. 6, 2021.

*Primary Examiner* — Hoang M Nguyen
(74) *Attorney, Agent, or Firm* — Polsinelli PC

(57) ABSTRACT

Aspects of the present disclosure include a system for turbo-compression cooling. The system may be aboard a marine vessel. The system includes a power cycle and a cooling cycle. The power cycle includes a first working fluid, a waste heat boiler configured to evaporate the working fluid, a turbine, and a condenser. The condenser condenses the working fluid to a saturated or subcooled liquid. The cooling cycle includes a second working fluid, a first compressor configured to increase the pressure of the second working fluid, a condenser configured to condense the second working fluid to a saturated or subcooled liquid after exiting the first compressor, an expansion valve, and an evaporator. The turbine and first compressor are coupled one to the other. The waste heat boiler receives waste heat from engine jacket water and lubricating oil from a ship service generator. The evaporator cools water in a shipboard cooling loop.

55 Claims, 26 Drawing Sheets

(51) Int. Cl.
*F25B 11/02* (2006.01)
*F25B 39/00* (2006.01)
*F25B 41/31* (2021.01)
*F01K 11/02* (2006.01)
*F01K 17/04* (2006.01)
*F01K 7/16* (2006.01)

(52) U.S. Cl.
CPC .............. *F25B 9/008* (2013.01); *F25B 11/02* (2013.01); *F25B 39/00* (2013.01); *F25B 41/31* (2021.01); *F05D 2220/31* (2013.01); *F05D 2240/60* (2013.01); *F05D 2260/213* (2013.01); *F05D 2260/232* (2013.01); *F25B 2327/00* (2013.01)

(58) Field of Classification Search
CPC ................ F25B 40/00; F25B 2339/047; F25B 2400/053; F25B 2400/054; F25B 6/04; F25B 7/00; F25B 5/00; F25B 27/00; F25B 41/39; F25B 2400/051; F25B 2400/121; F25B 2400/13; F25B 2400/23; F01K 7/16; F01K 11/02; F01K 17/04; F01K 17/005; F01K 23/065; F01K 25/10; F05D 2220/31; F05D 2240/60; F05D 2260/213; F05D 2260/232; Y02E 20/14
See application file for complete search history.

(56) References Cited

U.S. PATENT DOCUMENTS

| | | | | |
|---|---|---|---|---|
| 4,942,736 A | * | 7/1990 | Bronicki | .................. F02C 6/16 |
| | | | | 60/641.12 |
| 5,336,059 A | | 8/1994 | Rowley | |
| 6,349,551 B1 | | 2/2002 | Jirnov et al. | |
| 6,581,384 B1 | * | 6/2003 | Benson | .................. F25B 13/00 |
| | | | | 60/653 |
| 7,454,910 B2 | | 11/2008 | Hamada et al. | |
| 9,482,117 B2 | * | 11/2016 | Davidson | .............. F25B 25/005 |
| 2004/0238654 A1 | * | 12/2004 | Hagen | .................. F23C 99/003 |
| | | | | 237/12.1 |
| 2009/0320477 A1 | * | 12/2009 | Juchymenko | ......... F01K 23/065 |
| | | | | 60/651 |
| 2015/0183675 A1 | * | 7/2015 | Huang | .................. C03B 5/2353 |
| | | | | 65/32.5 |
| 2017/0045272 A1 | * | 2/2017 | Bandhauer | .............. F25B 27/00 |

* cited by examiner

| System | COP | Source Temperature | Corrosive Fluids | Working Pressure | Complexity |
|---|---|---|---|---|---|
| Turbo-Compression | High | 90 C | No | Moderate | Low |
| NH₃-H₂O Absorption | High | | | | Moderate |
| LiBr-H₂O Absorption | High | 90 C | | | Moderate |
| Multi-Effect Absorption | High | | | | |
| Solid-Vapor Adsorption | | 90 C | No | | |
| Steam Chiller | High | | No | Low/Mod | Moderate |
| Ejector Cycle | | 90 C | No | Moderate | Low |
| ORC + Electrical VC | | | No | Moderate | Low |

FIG. 18

| Engine | |
|---|---|
| % Load | 57% |
| Fuel Input | 3500 [kW] |
| Electrical Power | 1423 [kW] |
| Efficiency | 41% |
| Average # Operating | 2.6 |
| Engine Volume | 62.1 [m3] |

| Waste Heat | |
|---|---|
| Jacket Water | 375 [kW] |
| Lube Oil | 200 [kW] |
| Heat Exchanger Volume | 3 [m3] |
| Total | 575 [kW] |

| Ship Chillers | |
|---|---|
| Compressor Work | 144 [kW] |
| Seawater Weighted COP | 3.9 |
| Cooling Load | 555 [kW] |
| Average # Operating | 3.5 |
| Cooling per Engine | 747 [kW] |
| Compressor Power per Engine | 193 [kW] |
| Chiller Volume | 13.6 [m3] |
| Chiller Volume per Engine | 18.3 [m3] |

**FIG. 18 Option: *Chilled Water***

| | |
|---|---|
| Seawater Weighted COP | 0.86 |
| Cooling per Engine | 463 [kW] |
| System Volume | 6 [m3] |
| Reduction in Compressor Power Per Engine | 111 [kW] |
| Net Volume Increase | 4.6% |
| System Efficiency Improvement | 7.8% |

**FIG. 19 Option: *Seawater Precooling***

| | |
|---|---|
| New System COP | 5.73 |
| Required Total Electrical Work | 140 [kW] |
| System Volume | 6 [m3] |
| Reduction in Compressor Power Per Engine | 54 [kW] |
| Net Volume Increase | 4.6% |
| System Efficiency Improvement | 3.8% |

**FIG. 20 Option: *Power Boosted***

| | |
|---|---|
| New System COP | 6.72 |
| Required Total Electrical Work | 113 [kW] |
| TCCS Net Compressor Work | 65 [kW] |
| System Volume | 7.5 [m3] |
| Reduction in Compressor Power Per Engine | 146 [kW] |
| Net Volume Increase | 21.2% |
| System Efficiency Improvement | 10.2% |

*FIG. 22*

| Flow Bypass | Corrected Mass Flow Rate | Corrected Enthalpy Rise |
|---|---|---|
| [%] | [kg/s] | [kJ/kg] |
| 0% | 0.68 | 0.29 |
| 11% | 0.69 | 0.28 |
| 22% | 0.71 | 0.28 |
| 33% | 0.73 | 0.27 |
| 44% | 0.75 | 0.26 |
| 55% | 0.79 | 0.24 |
| 66% | 0.85 | 0.22 |
| 77% | 0.97 | 0.18 |
| 88% | 1.30 | 0.12 |

*FIG. 27*

ULTRA EFFICIENT TURBO-COMPRESSION COOLING SYSTEMS

CROSS-REFERENCE TO RELATED APPLICATIONS

This application claims the benefit of U.S. Provisional Application No. 62/941,570, filed Nov. 27, 2019, which is hereby incorporated by reference in its entirety into the present application.

GOVERNMENTAL RIGHTS

This invention was made with government support under DE-AR0000574 and DE-EE0008325 awarded by the Department of Energy. The government has certain rights in the invention.

TECHNICAL FIELD

The subject matter herein generally relates to turbo-compression cooling. More specifically, the subject matter herein relates to a system implementing a turbine coupled with a compressor to utilize low-grade waste heat to power a cooling cycle in various applications.

BACKGROUND

Industries of all types produce waste heat because of inefficient system performance. Conventionally, the waste heat is exhausted into the environment in the form of steam, heated water or air, or hot exhaust gases. As an example, an industrial plant operating a steam generator produces waste heat that is exhausted into the environment through its exhaust stack. As another example, marine diesel engines include various thermal energy streams (e.g., engine jacket water, lubrication oil, and aftercooler air) that reject heat to seawater. These systems, among others, can increase overall efficiency by recovering waste heat. Current systems for waste heat recovery, however, are large, cumbersome, and expensive. Additionally, each industry includes its own unique challenges to utilizing waste heat to improve system performance. It is with these thoughts in mind, among others, that aspects of the ultra-efficient turbo-compression cooling systems were developed.

SUMMARY

A turbo-compression cooling system includes a power cycle and a cooling cycle coupled one to the other. The power cycle implementing a waste heat boiler configured to evaporate a first working fluid and a turbine configured to receive the evaporated working fluid. The turbine having a plurality of vanes disposed around a central shaft and configured to rotate as the first working fluid expands to a lower pressure within the turbine. A condenser then condenses the first working fluid to a saturated or subcooled liquid and a mechanical pump pumps the liquid to reenter the waste heat boiler. The cooling cycle implements a compressor configured to increase the pressure of a second working fluid, a condenser configured to condense the second working fluid to a saturated or subcooled liquid upon exiting the compressor, an expansion valve wherein the second working fluid expands to a lower pressure, and an evaporator rejecting heat from a circulating fluid to the second working fluid, thereby cooling the circulating fluid. The turbine and compressor can be coupled one to the other, thereby coupling the power cycle and the cooling cycle.

Aspects of the present disclosure may include a system for turbo-compression cooling. In certain instances, the system is a shipboard system on a marine vessel. The shipboard system may include a power cycle and a cooling cycle. The power cycle may include a first working fluid, a waste heat boiler configured to evaporate the working fluid, a turbine, and a condenser. The turbine receiving the evaporated working fluid, and having a plurality of vanes disposed around a central shaft and configured to rotate about the central shaft. The plurality of vanes are configured to rotate as the working fluid expands to a lower pressure. The condenser condenses the working fluid to a saturated or subcooled liquid. The cooling cycle may include a second working fluid, a first compressor configured to increase the pressure of the second working fluid, a condenser configured to condense the second working fluid to a saturated or subcooled liquid after exiting the first compressor, an expansion valve, and an evaporator. The expansion valve configured to expand the second working fluid to a lower pressure. The evaporator rejecting heat from a circulating fluid to the second working fluid, thereby cooling the circulating fluid. The turbine and first compressor are coupled one to the other, thereby coupling the power cycle and the cooling cycle. The waste heat boiler receives waste heat from engine jacket water and lubricating oil from a ship service diesel generator. In addition, the evaporator cools water in a shipboard cooling loop.

In certain instances, the water in the shipboard cooling loop may be seawater that cools shipboard chillers in the marine vessel. In certain instances, the shipboard cooling loop provides cooling within the marine vessel.

In certain instances, the cooling cycle further may include a second compressor configured to discharge the second working fluid to the first compressor. In certain instances, the second compressor may be electrically powered.

In certain instances, the first compressor may be powered via the waste heat from the waste heat boiler.

In certain instances, the first working fluid and the second working fluid are the same fluid.

In certain instances, the power cycle and first working fluid are hermetically sealed from the cooling cycle and the second working fluid.

In certain instances, the turbine and the first compressor are magnetically coupled one to the other, and the turbine has a first shaft and the first compressor has a second shaft, one of the first shaft and the second shaft disposed around at least a portion of the other of the first shaft and the second shaft, the first shaft having one or more first polarity magnetic elements and the second shaft having one or more second polarity magnetic elements, the first polarity and the second polarity being opposite and magnetically engaged with one another.

In certain instances, the system further may include a recuperator configured to receive heat rejected by the first working fluid, and the recuperator transfers the rejected heat to the saturated or subcooled liquid as the working fluid re-enters the waste heat boiler.

Aspects of the present disclosure may include a method of turbo-compression cooling. The method may include the following steps. The method may include receiving, from a waste heat source, heat waste in a waste heat boiler. The method may include evaporating a first working fluid using the heat waste in the waste heat boiler. The method may include generating mechanical power through expansion of the first working fluid to a lower pressure in a turbine, the expansion of the first working fluid rotating one or more turbine vanes. The method may include condensing the first working fluid to a saturated or subcooled liquid in a condenser. The method may include pressurizing the saturated or subcooled liquid through a mechanical pump to re-enter the waste heat boiler. The method may include transferring the generated mechanical power to a first compressor, the compressor configured to receive a second working fluid. The method may include compressing the second working fluid via the first compressor thereby increasing the pressure of the vapor. The method may include condensing the second working fluid in a condenser to a saturated or subcooled liquid. The method may include expanding the second working fluid to a lower pressure in an expansion valve. In addition, the method may include rejecting heat through an evaporator from circulating cooling fluid to the second working fluid.

In certain instances, the method further may include compressing the second working fluid via a second compressor powered separately from the first compressor; and discharging the second working fluid from the second compressor to the first compressor. In certain instances, the first working fluid and the second working fluid are the same fluid.

In certain instances, the method further may include rejecting heat from the first working fluid exiting the turbine in a recuperator, and absorbing heat in the first working fluid exiting the mechanical pump.

In certain instances, the method further may include rejecting heat from the second working fluid in the recuperator.

In certain instances, the method further may include recirculating a portion of the second working fluid exiting the first compressor to an inflow of the second compressor to bypass the recuperator.

In certain instances, the method further may include preheating the second working fluid in a suction-line heat exchanger prior to compressing the second working fluid via the second compressor.

In certain instances, the second working fluid may be preheated via the second working fluid after discharge from the condenser.

In certain instances, the method further may include recirculating a portion of the second working fluid exiting the first compressor to an inflow of the first compressor to bypass the recuperator.

In certain instances, the power cycle and first working fluid are hermetically sealed from the cooling cycle and the second working fluid.

In certain instances, the second compressor may be electrically powered.

In certain instances, the method further may include rejecting heat from the second working fluid exiting the second compressor in an economizer, and absorbing heat in the first working fluid exiting the mechanical pump. In certain instances, the method may further include rejecting heat from the first working fluid in an economizer.

In certain instances, the method further may include rejecting heat from the first working fluid exiting the turbine in a recuperator, and absorbing heat in the first working fluid exiting the mechanical pump.

Aspects of the present disclosure may include a system for turbo-compression cooling in a facility with waste heat. The system may include a power cycle and a cooling cycle. The power cycle may include a first working fluid, a waste heat boiler configured to evaporate the working fluid, a turbine receiving the evaporated working fluid, the turbine having a plurality of vanes disposed around a central shaft and configured to rotate about the central shaft, the plurality of vanes configured to rotate as the working fluid expanding to a lower pressure, and a condenser condensing the working fluid to a saturated or subcooled liquid. The cooling cycle may include a second working fluid, a first compressor configured to increase the pressure of the second working fluid, a condenser configured to condense the second working fluid to a saturated or subcooled liquid after exiting the first compressor, an expansion valve configured to expand the second fluid to a lower pressure upon passing therethrough, and an evaporator rejecting heat from a circulating fluid to the second working fluid, thereby cooling the circulating fluid. The turbine and first compressor are coupled one to the other, thereby coupling the power cycle and the cooling cycle. The waste heat boiler may be configured to receive the waste heat from the facility, which has a centralized refrigeration system, which can have ammonia as the working fluid. The evaporator in the turbo-compression cooling system precools ammonia in the refrigeration system to lower the amount of compressor work required for the refrigeration system.

In certain instances, the ammonia may be cooled from about 27° C. to about 6.5° C.

In certain instances, the ammonia may be precooled between a receiver of the ammonia-cooling loop and an accumulator of the ammonia-cooling loop.

In certain instances, the ammonia may be precooled between the receiver of the ammonia-cooling loop and an expansion valve of the ammonia-cooling loop.

In certain instances, the ammonia may be precooled between a cold box of the ammonia-cooling loop and an accumulator of the ammonia-cooling loop.

Aspects of the present disclosure may include a system for turbo-compression cooling in a distributed refrigeration system in a facility producing waste heat. The distributed refrigeration system may include an accumulator receiving a two-phase mixture of a refrigerant from an expansion valve. The refrigerant in a liquid state from the accumulator may be repressurized and sent to a distributed set of evaporators. The system may include a power cycle and a cooling cycle. The power cycle may include a power cycle fluid, a waste heat boiler configured to evaporate the power cycle fluid, the waste heat boiler receiving waste heat from the facility, a turbine, and a condenser. The turbine receives the evaporated power cycle fluid. The turbine includes a plurality of vanes disposed around a central shaft and configured to rotate about the central shaft. The plurality of vanes configured to rotate as the power cycle fluid expands to a lower pressure. The condenser condenses the power cycle fluid to a saturated liquid. The cooling cycle may include a cooling cycle fluid, a first compressor configured to increase the pressure of the cooling cycle fluid. The first compressor may be coupled to the turbine, thereby coupling the power cycle and the cooling cycle. The cooling cycle further includes a condenser configured to condense the cooling cycle fluid to a saturated liquid after exiting the first compressor; an expansion valve configured to expand the cooling cycle fluid to a lower pressure, and an evaporator integrated with the refrigerant of the distributed refrigeration system so as to provide cooling to the refrigerant, the refrigerant rejecting heat to the second working fluid.

In certain instances, the refrigerant may be cooled prior to entering the expansion valve.

In certain instances, the refrigerant may be cooled after exiting a receiver of the distributed refrigeration system.

In certain instances, the refrigerant may be ammonia.

In certain instances, the refrigerant may be cooled from about 27 degrees Celsius to about 6.5 degrees Celsius.

In certain instances, the refrigerant may be cooled about 20.5 degrees Celsius.

In certain instances, cooling of the refrigerant via the evaporator of the cooling cycle decreases vapor percentage of the two-phase mixture of the refrigerant received in the accumulator.

Aspects of the present disclosure may include a method of turbo-compression cooling. The method may include the following steps. Receiving, from a waste heat source, heat waste in a waste heat boiler. Evaporating a first working fluid using the heat waste in the waste heat boiler. Generating mechanical power through expansion of the first working fluid to a lower pressure in a turbine, the expansion of the first working fluid rotating one or more turbine vanes. Condensing the first working fluid to a saturated or subcooled liquid in a condenser. Pressurizing the saturated or subcooled liquid through a mechanical pump to re-enter the waste heat boiler. Transferring the generated mechanical power to a compressor, the compressor configured to receive a second working fluid. Compressing the second working fluid via the compressor thereby increasing the pressure of the saturated vapor. Condensing the second working fluid in a condenser to a saturated or subcooled liquid. Expanding the second working fluid to a lower pressure via an expansion valve. Rejecting heat through an evaporator from circulating cooling fluid to the second working fluid. In addition, rejecting heat from the second working fluid exiting the compressor in an economizer, and absorbing heat in the first working fluid exiting the mechanical pump in the economizer.

In certain instances, the first working fluid and the second working fluid are the same fluid.

In certain instances the method may further rejecting heat from the first working fluid exiting the turbine in a recuperator, and absorbing heat in the first working fluid exiting the mechanical pump in the recuperator.

In certain instances the method may further rejecting heat from the second working fluid in the recuperator.

In certain instances the method may further rejecting heat from the second working fluid in a recuperator.

In certain instances the method may further recirculating a portion of the second working fluid exiting the compressor to bypass the recuperator.

In certain instances the method may further preheating the second working fluid in a suction-line heat exchanger prior to compressing the second working fluid via the compressor.

In certain instances, the power cycle and first working fluid are hermetically sealed from the cooling cycle and the second working fluid.

Aspects of the present disclosure may include a method of turbo-compression cooling. The method may include the following steps. Receiving, from a waste heat source, heat waste in a waste heat boiler. Evaporating a first working fluid using the heat waste in the waste heat boiler. Generating mechanical power through expansion of the first working fluid to a lower pressure in a turbine, the expansion of the first working fluid rotating one or more turbine vanes. Condensing the first working fluid to a saturated or subcooled liquid in a condenser. Pressurizing the saturated or subcooled liquid through a mechanical pump to re-enter the waste heat boiler. Transferring the generated mechanical power to a compressor, the compressor configured to receive a second working fluid. Compressing the second working fluid via the compressor thereby increasing the pressure of the saturated vapor. Condensing the second working fluid in a condenser to a saturated or subcooled liquid. Expanding the second working fluid to a lower pressure via an expansion valve. Rejecting heat through an evaporator from circulating cooling fluid to the second working fluid. In addition, preheating the second working fluid in a suction-line heat exchanger prior to compressing the second working fluid via the compressor.

In certain instances, the first working fluid and the second working fluid are the same fluid.

In certain instances the method may further rejecting heat from the first working fluid exiting the turbine in a recuperator, and absorbing heat in the first working fluid exiting the mechanical pump in the recuperator.

In certain instances the method may further rejecting heat from the second working fluid in the recuperator.

In certain instances the method may further rejecting heat from the second working fluid in a recuperator.

In certain instances, the method may further include recirculating a portion of the second working fluid exiting the compressor to bypass the recuperator.

In certain instances, the second working fluid is preheated in the suction-line heat exchanger via the second working fluid exiting the condenser.

In certain instances, the power cycle and first working fluid are hermetically sealed from the cooling cycle and the second working fluid.

BRIEF DESCRIPTION OF THE DRAWINGS

Implementations of the present technology will now be described, by way of example only, with reference to the attached figures, wherein:

FIG. 18 is a table showing relative performance of the turbo-compression cooling system relative to other technologies in the art;

FIG. 22 is table showing the various performances of the systems of FIGS. 18-20;

FIG. 27 is a table showing the performance of the electric compressor and bypass system.

DETAILED DESCRIPTION

Figure 1:
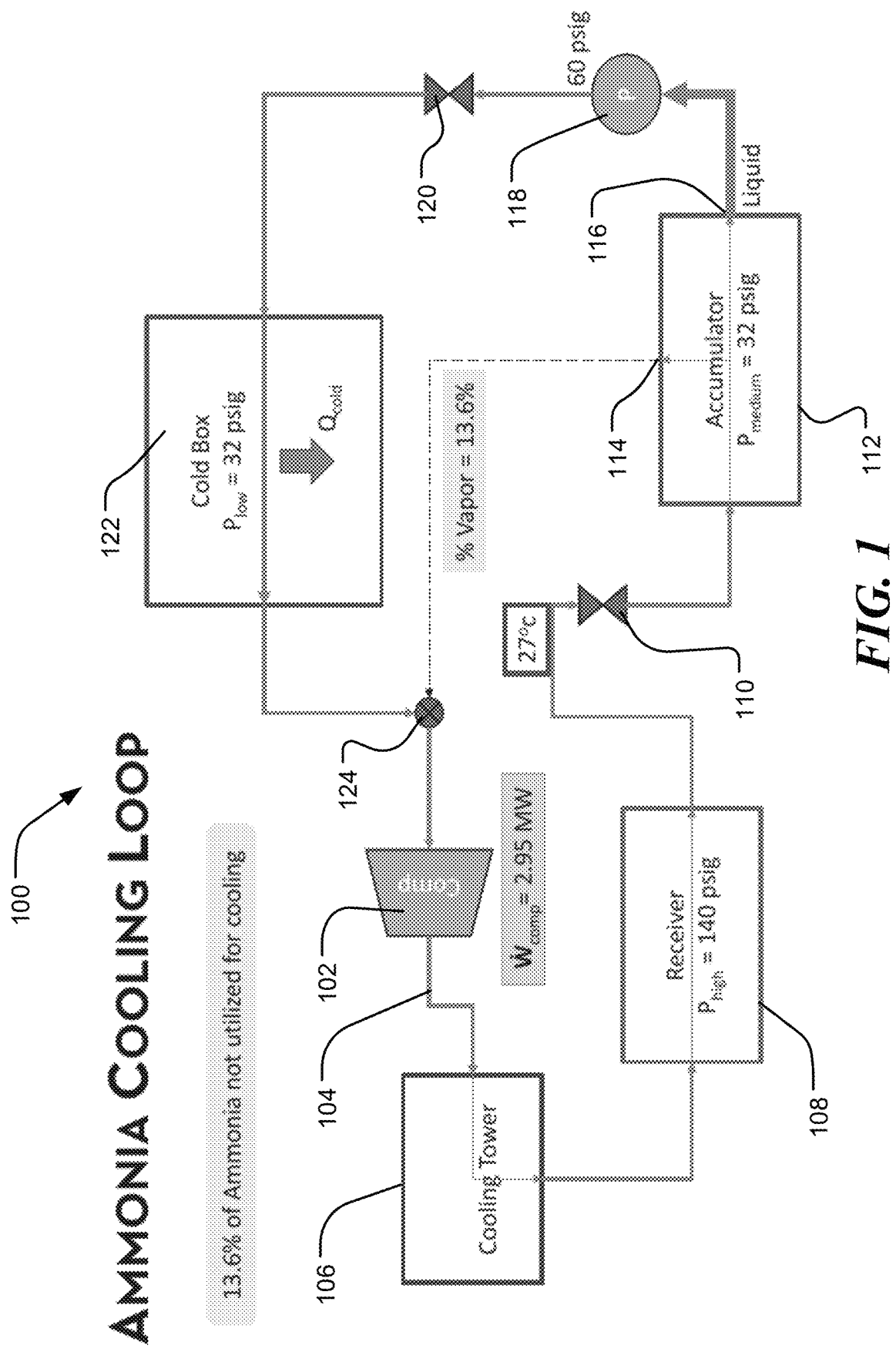
FIG. 1 is a diagrammatic view of an ammonia cooling loop in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means, "including, but not necessarily limited to"; it specifically indicates open-ended inclusion or membership in a so-described combination, group, series and the like.

A "thermal fluid" is defined as any working fluid optimized for use in a power/heating cycle. A "cooling fluid" is defined as any working fluid optimized for use in a cooling/refrigeration cycle. In some instances, a thermal fluid and cooling fluid can be the same, such as water, which can operate both a power cycle and cooling cycle.

The following portion of the application is broken into three sections describing different implementations of a turbo-compression cooling system. Section I describes using a turbo-compression cooling system in an ammonia-cooling loop. Section II describes using a turbo-compression cooling system in a marine diesel generation set. In addition, Section III describes a turbo-compression cooling system in a generalized industrial context. While Sections I and II describe specific implementations and context for the use of a turbo-compression cooling system, the systems outlined in those sections are applicable for use in other systems that generate waste heat. For example, Section II describes utilizing waste heat from engine jacket water and lubricating oil. Other generator systems may generate the same or similar low-grade waste heat that could benefit from the turbo-compression cooling system; thus, the description in the sections are not limiting. Similarly, the turbo-compression cooling system described in Section I is applicable to other systems with similar principles. All descriptions of the turbo-compression cooling system utilize ultra-low temperature waste heat in order to power the power cycle (organic or inorganic Rankine cycle) portion system, which in turn drives a compressor in the cooling cycle (refrigeration cycle). Therefore, the turbo-compression cooling systems as described herein may be applied to any system that generates low temperature waste heat and desires efficiency gains in the overall system. Additionally, the components of the individually described systems may be applied to the other systems without limitation.

I. Distributed Cooling Systems and Turbo-Compression Cooling System

FIG. 1 illustrates a distributed cooling system 100, such as an ammonia-cooling loop in a refrigeration system of a food or beverage industrial plant. A distributed cooling system has multiple evaporators (also known as "Cold Boxes") in which the fluid temperature is individually controlled. There can be multiple evaporators, each with their evaporation temperature individually controlled. However, a common receiver and a common accumulator is likely. An ammonia-cooling loop, in particular, is a vapor-compression refrigeration system where ammonia is the fluid within the system that is used to remove heat from an area, and then dissipate it in another area. Ammonia is an efficient fluid in this context as it has a low boiling point of −33.6° C. at a fluid pressure of 1 bar. While this section describes ammonia as the fluid within the distributed cooling system 100, it is to be understood that other refrigerants may be utilized without departing from the teachings of this disclosure. For example, distributed cooling systems 100 may also utilize CO2, R404A, R407C, R134a, R1234ze(e), hydrocarbons, hydrofluorocarbon, hydrofluoroethers, and hydrofluoroolefins, among others, as the refrigerant within the system.

The cooling system 100 includes a compressor 102 that compresses the fluid (e.g., ammonia) 104, which causes the fluid 104 to heat up as it is pressurized. The fluid 104 is received within a cooling tower 106 where heat from the fluid 104 dissipates. As the fluid 104 dissipates heat, the fluid 104 condenses and converts to a liquid, still at high pressure. A receiver 108 receives the fluid 104. In certain instances, the fluid 104 is received by the receiver 108 at a pressure of about 140 pounds per square inch gauge (PSIG). The receiver 108 is a storage vessel for the fluid 104 that is designed to hold excess fluid 104 not in circulation. The receiver 108 may contain a filter for trapping debris within the line. After the receiver 108, the fluid 104 travels through an expansion valve 110. The expansion valve 110 causes a decrease in pressure in the fluid 104 by, for example, passing it through a small diameter tube or orifice. In the context of an ammonia cooling system 100, the fluid 104 may enter the expansion valve 110 at about +27° C., and, upon exiting the expansion valve 110, the fluid 104 begins to boil at −9° C.

The fluid 104 is then received in an accumulator 112 at a pressure of about 32 PSIG. The accumulator 112 is a filter for the system 100 that includes a desiccant. The accumulator 112 prevents liquid fluid 104 from entering the compressor 102, which only pumps vapor, not liquid. The accumulator 112 has two outlets, a vapor outlet 114 and a liquid outlet 116. At the vapor outlet 114 is a metering ejector that vaporizes the fluid 104 and sends it to the compressor 102. In the context of an ammonia cooling system 100, about 13.6% of ammonia is routed from the accumulator 112, out the vapor outlet 114 (i.e., fluid 104 is 100% vapor), and directly to the compressor 102. Stated differently, 13.6% of the fluid 104 (i.e., the vapor) is not utilized for cooling, but is rerouted through the system 100.

The fluid 104 exiting the liquid outlet 116 is received by a pump 118 that pumps the fluid 104 to about 60 PSIG. The fluid 104 is then received by an expansion valve 120, which is located very near the evaporator within the cold box 122. After the expansion valve 120, the fluid 104 then enters a refrigerated space or cold box 122 where the pressure is about 32 PSIG. The refrigerated space 122 may be used within the industrial facility to cool a product (e.g., food, beverages). The cold box 122 may contain one or more evaporators therein. The fluid 104 is evaporated in the refrigerated space 122 as heat from the product heats the fluid 104. Upon exiting the refrigerated space 122, the fluid 104 mixes with the vapor fluid 104 exiting the vapor outlet 114 of the accumulator 112 at a valve 124. The combined fluid 104 then enters into the compressor 102 to complete the loop of the cooling system 100.

Figure 2:
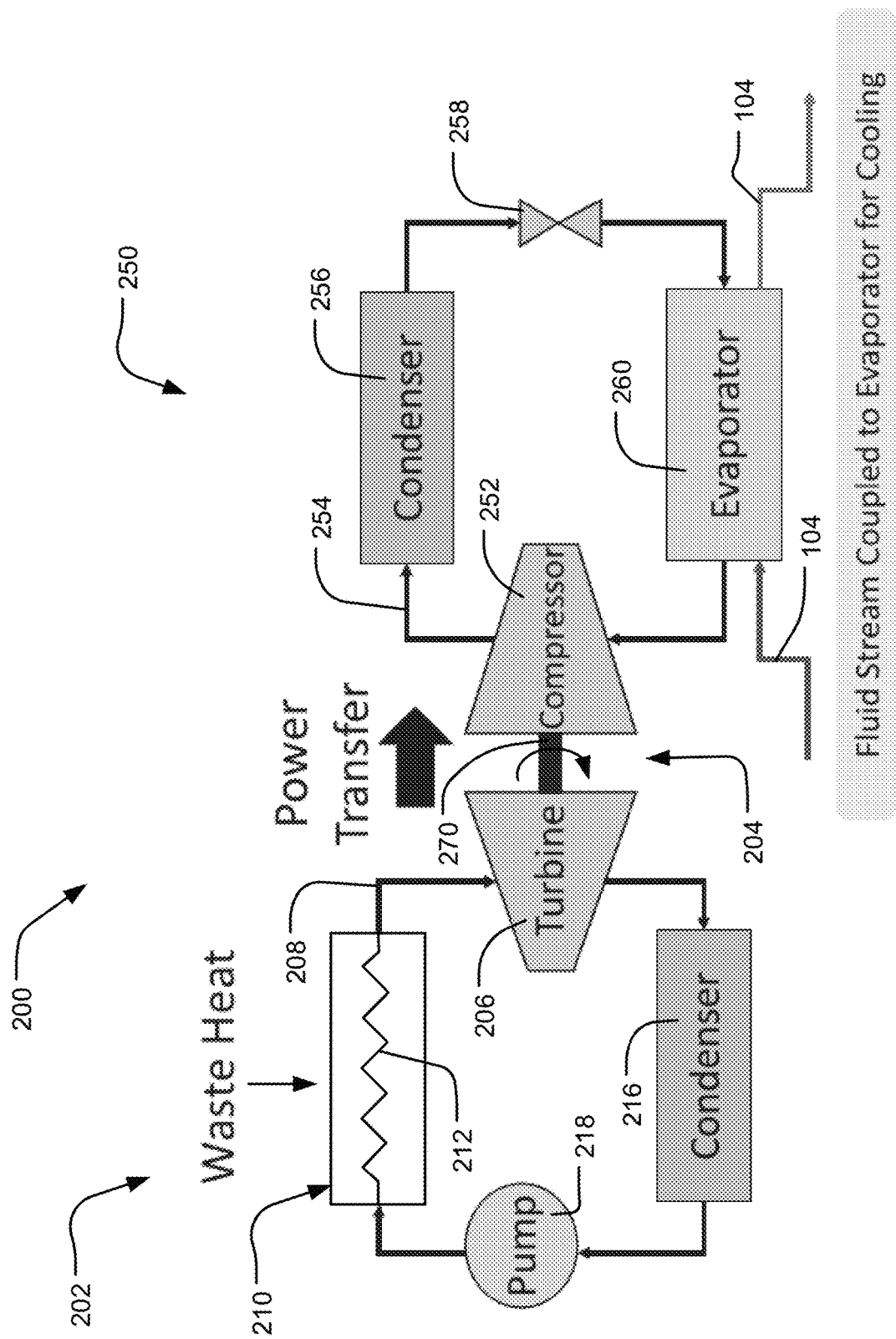
FIG. 2 is a diagrammatic view of a cooling system implementing a turbo-compressor in accordance with the present disclosure.

The efficiency of the cooling system 100 can be increased by decreasing the percentage of vapor fluid 104 that bypasses the refrigerated space 122 by being recirculated through the system 100. Stated differently, the efficiency of the cooling system 100 can be increased by increasing the percentage of liquid fluid 104 in the accumulator 112. This can be done by decreasing the temperature of the incoming fluid 104 into the expansion valve 110. Accordingly, a turbo compression cooling system 200, as shown in FIG. 2, will be described. Then, in reference to FIG. 3, the turbo compression cooling system 200 will be described as it is integrated into the cooling system 100 of FIG. 1.

FIG. 2 illustrates an ultra-efficient turbo-compressor cooling system 200. The ultra-efficient turbo-compressor cooling system 200 can be implemented within the cooling system 100, of FIG. 1. The ultra-efficient turbo-compressor cooling system 200 can have a power cycle 202 and a cooling cycle 250 coupled together by a turbo-compressor 204. The turbo-compressor 204 can be a turbine 206 and a compressor 252 coupled together, as will be discussed in more detail below.

The power cycle 202 operates with a first working fluid 208 receiving waste heat from a waste heat source, such as the heat dissipated in the cooling tower 106 of the cooling system 100 of FIG. 1. The waste heat, instead of being dissipated in the cooling tower 106, may be used to heat the first working fluid 208 in the power cycle 202. Additionally or alternatively, the waste heat may be from the exhaust stack of a boiler, engine coolant from an engine, and/or unused fuel (e.g., biogas) within the facility. As another example, the waste heat boiler 210 can have a heat exchanger 212 configured to reject waste heat from the cooling system 100 to the first working fluid 208. In this example, the waste heat boiler 210 can receive the fluid 104 from the cooling system 100 at a first temperature and exit the waste heat boiler 210 at a second temperature, lower than the first temperature. The heat exchanger 212 utilizes the waste heat from the cooling system 100 to evaporate the first working fluid 208 in the waste heat boiler 210. The first working fluid 208 exits the waste heat boiler 210 as a vapor and enters the turbine 206.

The turbine 206 can have a plurality of vanes coupled to a shaft 270, the plurality of vanes configured to impart rotation upon the shaft 270 as the first working fluid 208 expands within the turbine 206. Expansion of the first working fluid 208 within the turbine 206 generates mechanical power, thus rotating the shaft 270.

In some instances, the turbine 206 can be a multi-stage turbine having a plurality of vanes arranged to allow expansion of the first working fluid 208 and a second plurality of vanes arranged to allow further expansion of the first working fluid 208. The plurality of vanes and the plurality of second vanes are arranged for optimal performance based on the operating pressures, temperatures, and first working fluid 208 of the power cycle 202 of the ultra-efficient turbo-compressor cooling system 200. For a further description of the turbo compression cooling system, among other subject matter, reference is made to U.S. Pat. No. 10,294,826, which is hereby incorporated by reference in its entirety.

Upon exiting the turbine 206, the first working fluid 208 enters a condenser 216. In certain instances, the condenser 216 may be a dry air condenser, or a wet air condenser. The condenser 216 condenses the first working fluid 208 from a vapor to a saturated liquid. The condenser 216 can be an air-cooled heat exchanger allowing the first working fluid 208 to reject heat to the environment. The first working fluid 208 leaves the condenser 216 as a saturated liquid and enters a mechanical pump 218. The mechanical pump 218 re-pressurizes the first working fluid 208 and circulates the working fluid 208 back to the waste heat boiler 210.

While the ultra-efficient turbo-compressor cooling system 200 is shown and described with respect to the power cycle 202 as shown in FIG. 2, the power cycle 202 may alternatively include a recuperator. The recuperator may be omitted for power cycles involving working fluids with specific properties that mitigate the efficiency gain provided by the recuperator.

Still referring to FIG. 2, the cooling cycle 250 operates with a second working fluid 254. The cooling cycle 250 operates by the compressor 252 receiving the mechanical work generated by the turbine 206 as described above. The second working fluid 254 enters the compressor as a saturated vapor, and the compressor 252 raises the pressure of the second working fluid 254. The second working fluid 254 moves from the compressor 252 to a condenser 256.

In some instances, the compressor 252 can be a multi-stage compressor having a plurality of impellers arranged to allow compression of the second working fluid 254 and a second plurality of impellers arranged to allow further expansion of the second working fluid 254. The plurality of impellers and the plurality of second impellers are arranged for optimal performance based on the operating pressures, temperatures, and second working fluid 208 of the cooling cycle 250 of the ultra-efficient turbo-compressor cooling system 200.

The condenser 256 is an air-cooled heat exchanger condensing the second working fluid 254 from a slightly superheated vapor to a saturated or subcooled liquid. The condenser 256 can have a forced airflow across the heat exchanger to increase efficiency and cooling of the second working fluid. The second working fluid 254 exits the condenser 256 and enters an expansion valve 258.

The expansion valve 258 can operate as a flow control device within the cooling cycle 250. The expansion valve 258 controls the amount of the second working fluid 254 flowing from the condenser 256 to an evaporator 260. The high-pressure liquid second working fluid 254 exiting the condenser 256 enters the expansion valve 258, which allows a portion of the second working fluid 254 to enter the evaporator 260. The expansion valve 258 allows a pressure drop in the second working fluid 254, thus expanding to a lower pressure prior to entering the evaporator 260.

The expansion valve 258 can have a temperature-sensing bulb filled with a gas similar to the second working fluid 254. The expansion valve 258 opens as the temperature on the bulb increases from the second working fluid 254 exiting the condenser 256. The change in temperature creates a change in pressure on a diaphragm and opens the expansion valve 258. The diaphragm can be biased to a closed position by a biasing element, such as a spring or actuator, and the change in pressure on the diaphragm and causes the biasing element to move the expansion valve 258 to an open position.

The evaporator 260 receives the second working fluid 254 from the expansion valve 258 and allows expansion to a phase that includes both liquid and vapor, with more liquid that vapor. The evaporator 260 passes the second working fluid 254 through to absorb heat from a cooling fluid, such as the fluid 104 from the cooling system 100 of FIG. 1, thereby generating the desired cooling effect by reducing the temperature of the cooling fluid 104. The expansion valve 258 is used to limit flow of the second working fluid 254 into the evaporator 260 to keep pressure low and allow expansion of the second working fluid 254 into a combined liquid and vapor state, with more liquid that vapor.

The evaporator can receive the cooling fluid 104, from the system 100 of FIG. 1, at a first predetermined temperature and discharge the cooling fluid 104 at a second predetermined temperature. The second predetermined temperature being lower than the first predetermined temperature. The temperature change occurs because of the second working fluid 254 absorbing heat from the circulating cooling fluid 262.

The first working fluid 208 and the second working fluid 254 can be hermetically sealed one from the other within the turbo-compressor 204. The first working fluid can be a thermal fluid optimized for use in the power cycle 202. Representative thermal fluids can include refrigerants, hydrocarbons, inorganic fluids, and/or any combination thereof, which can be operate in the subcritical two-phase region or the supercritical region depending on the waste heat temperature and fluid flow rate and the desired trade-off between compactness and COP. Example subcritical fluids can include refrigerants 1-methoxyheptafluoropropane (HFE-7000), methoxy-nonafluorobutane (HFE-7100), or octafluorocyclobutane (RC318), hydrocarbon propane, or inorganic water or ammonia. Example supercritical fluids include refrigerants octafluoropropane (R218) and carbon dioxide, hydrocarbon ethane, and inorganic xenon.

The second working fluid 254 can be a cooling fluid optimized for use in the cooling cycle 250. Representative cooling fluids can include refrigerants, hydrocarbons, inorganic fluids, and/or any combination thereof, which can be operate in the subcritical two-phase region or the supercritical region depending on the waste heat temperature and fluid flow rate and the desired trade-off between compactness and COP. Example subcritical fluids can include refrigerants 1,1-Difluoroethane (R-152a), pentafluoropropane (R-245fa), 1,1,1,2-Tetrafluoroethane (R-134a), hydrocarbon propane, or inorganic water or ammonia. Example supercritical fluids include refrigerants octafluoropropane (R218) and carbon dioxide, hydrocarbon ethane, and inorganic xenon.

While the first working fluid 208 and the second working fluid 254 can be the same fluid, such as water, the ultra-efficient turbo-compressor cooling system 200 can achieve higher COP utilizing different working fluids. Proposed combinations of the first working fluid and second working fluid can include, but are not limited to, HFE-7100/R245fa; HFE-7000/R152a; RC318/R152a, and R218/R152a, respectively listed as first working fluid/second working fluid.

Figure 3:
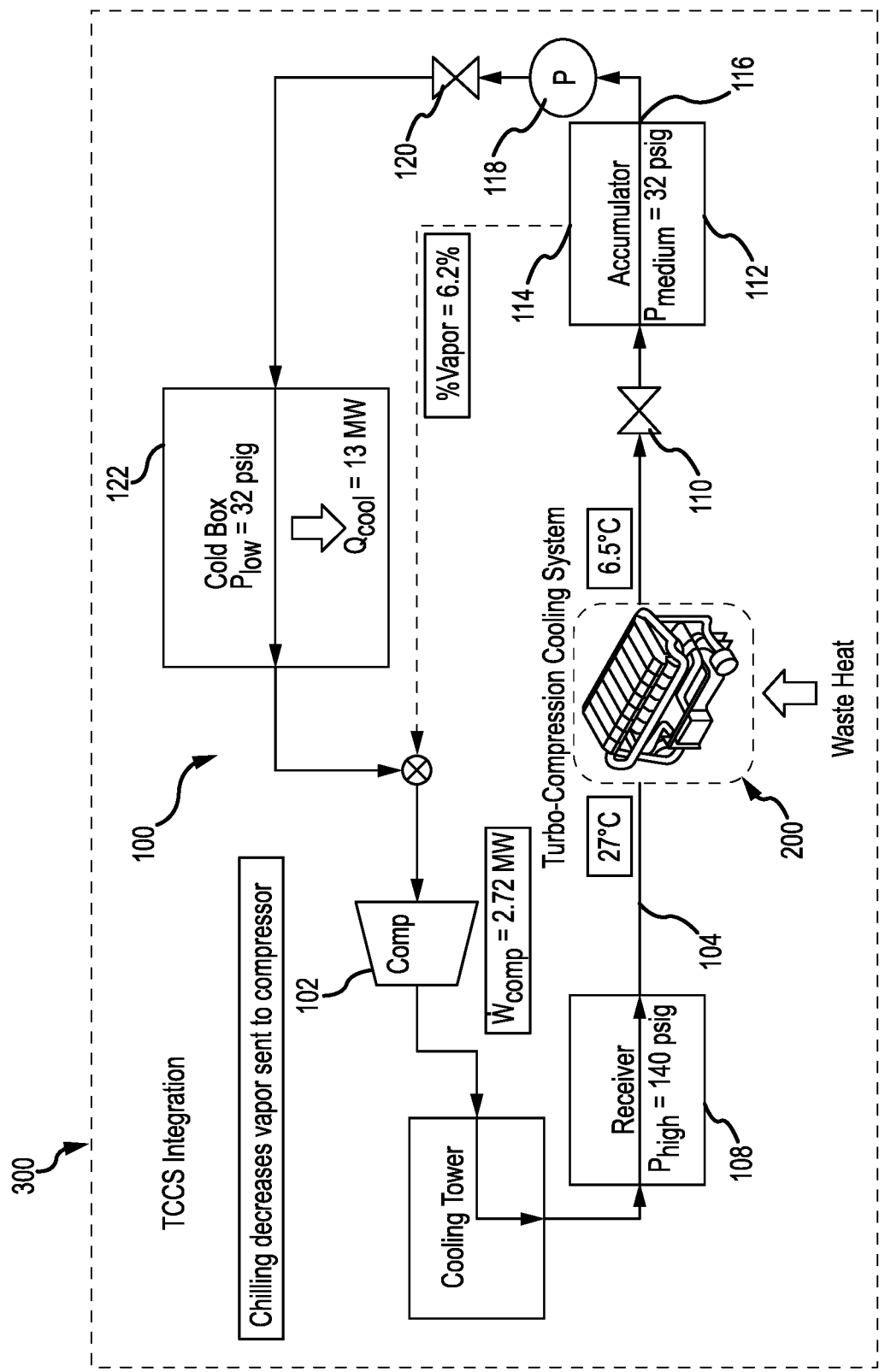
FIG. 3 is a diagrammatic view of an example embodiment of a cooling system, such as the ammonia cooling loop of FIG. 1, implementing a turbo-compressor of FIG. 2.

FIG. 3 illustrates a specific example of an efficient cooling system 300 integrating an ultra-efficient turbo-compressor cooling system 200 with an ammonia cooling system 100. As seen in FIG. 3, the ultra-efficient turbo-compressor cooling system 200 integrates with the cooling system 100 between the receiver 108 and the expansion valve 110 to pre-chill or lower the temperature of the fluid 104 prior to entry through the expansion valve 110. Ultimately, the fluid 104 is a lesser percentage of vapor as it is received in the accumulator 112, causing less vapor to be sent to the compressor 102 via the vapor port 114 of the accumulator 112. Stated differently, more liquid fluid 104 is sent through the cold box 122 for cooling instead of being re-routed through the compressor 102. In the instance of a cooling cycle 300 integrating an ultra-efficient turbo-compressor cooling system 200 into an ammonia cooling system 100, the percentage of vapor fluid 104 that bypasses the cold box 122 can be reduced to about 6.2%, from about 13.6% without the integration of the ultra-efficient turbo-compressor cooling system 200. This efficiency increase leads to reduced electrical consumption in the overall system 300.

Figure 4:
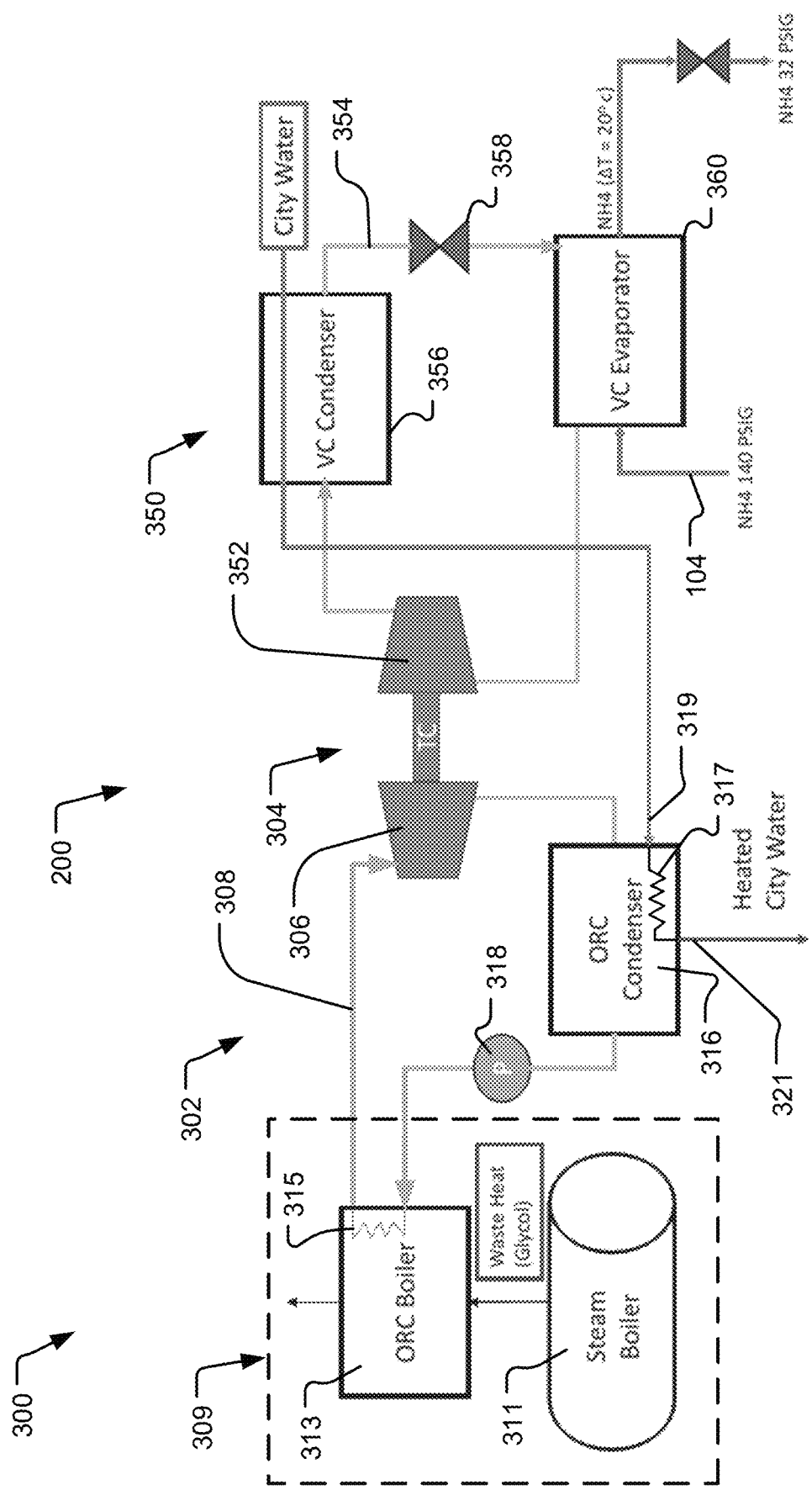
FIG. 4 is a detailed diagrammatic view of the efficient cooling system integrating an ultra-efficient turbo-compressor cooling system into the ammonia cooling system of FIG. 3.

FIG. 4 is a detailed diagrammatic view of the ultra-efficient turbo-compressor cooling system 200 of the efficient cooling system 300 of FIG. 3. More particular, FIG. 4 illustrates how the turbo-compressor cooling system 200 may be integrated into the overall system 300 to enhance the efficiency of system 300 as well as other systems within the facility. As seen in the figure, the turbo-compressor cooling system 200 includes a power cycle 302 and a cooling cycle 350 that can be coupled together by a turbo compressor 304. The turbo-compressor 304 can have a turbine 306 and a compressor 352. In certain instances, the turbo-compressor 304 may have a magnetic synchronous coupling, described in U.S. Pat. No. 10,294,826, which is hereby incorporated by reference in its entirety. The magnetic synchronous coupling can hermetically seal the power cycle 302 and the cooling cycle 350 allowing the power cycle 302 to implement a first working fluid 308 and the cooling cycle 350 to implement a second working fluid 354. In certain instances, the turbo-compressor 304 does not include a magnetic synchronous coupling. The first working fluid 308 and the second working fluid 354 being different and each optimized for performance in their respective cycle. In the illustrated embodiment, the first working fluid 308 is HFE-7100 and the second working fluid 354 is R245fa.

The power cycle 302 operates with the first working fluid 308 receiving waste heat from a waste heat portion 309 of a co-located process within the facility. In one instance, the waste heat portion 309 is from a co-located process that generates exhaust steam in a steam boiler. The exhaust steam from the steam boiler 311 can be relatively hot (e.g., 300 F). This exhaust heat from the steam boiler 311 may be captured in a glycol-heating loop, and then used in an ORC boiler 313 for heating the first working fluid 308. In another instance, the waste heat portion 309 may be from the ammonia cooling cycle 100. For example, a glycol-heating loop 309 may be used to cool the relatively hot ammonia fluid 104 in the cooling cycle 100 after the discharge of the compressor or the warm lubrication oil in the ammonia compressor. By cooling the ammonia fluid 104, the glycol is heated and, thus, provides the opportunity to be used beneficially in providing heat to the first working fluid 308. The glycol-heating loop 309 may be located at the cooling tower 106 stage of the cooling loop 100 shown in FIG. 1. The glycol-heating loop 309, as seen in FIG. 4, may include a steam boiler 311 and an organic Rankine cycle ("ORC") boiler 313, among other possible components of the system 309. In the illustrated example, a waste heat exchanger 315 receives the first working fluid 308 and is heated by the glycol-heating loop 309. The first working fluid enters the heat exchanger 315 at a first temperature, and exits the heat exchanger 315 at a second temperature that is higher than the first temperature.

The turbine 306 has a plurality of vanes configured to rotate as the first working fluid 308 expands within the turbine 306. The gaseous first working fluid 308 exiting the waste heat exchanger 315 enters the turbine 306 and expansion of the first working fluid 308 within the turbine 306 generates mechanical power. The turbine 306 has greater than 80% efficiency in generating mechanical power from the expansion of the first working fluid 308. The mechanical power generated can be transferred to the compressor 352 of the turbo-compressor 304. In the instance of the turbo-compressor 304 including a magnetic synchronous coupling, power loss may be reduced between the turbine 306 and the compressor 352 while hermetically sealing the power cycle 302 and the cooling cycle 350.

Upon exiting the turbine 306, the first working fluid 308 enters a condenser 316. The condenser 216 condenses the first working fluid 308 from a vapor to a saturated liquid by rejecting heat to the environment. Instead of rejecting the waste heat to the environment, the waste heat may be utilized to heat water, among other beneficial uses. As seen in FIG. 4, the condenser 316 may be integrated with a heat exchanger 317 that heats water for use within the facility (e.g., space heating), or elsewhere. The heat exchanger 317 may be connected to a cold-water inlet 319 and a hot water outlet 321. In this way, the water enters the heat exchanger 317 at a first temperature and exits at a second temperature that is higher than the first temperature.

The first working fluid 308 leaves the condenser 316 as a saturated liquid and enters a mechanical pump 318. The mechanical pump 318 re-pressurizes the first working fluid 308 and circulates the working fluid 308 to the heat exchanger 315 utilizing the waste heat from the glycol-heating loop 309. Still referring to FIG. 4, the cooling cycle 350 operates with the second working fluid 354. The cooling cycle 350 operates by the compressor 352 receiving the mechanical work generated by the turbine 306, as described above. The second working fluid 354 enters the compressor 352 as a saturated vapor, and the compressor 352 raises the pressure of the second working fluid 354. In the illustrated embodiment, the compressor 352 can achieve an 80% or greater efficiency. The second working fluid 354 moves from the compressor 352 to a condenser 356. In certain instances, the condenser 356 is an air-cooled heat exchanger condensing the second working fluid 354 from a slightly superheated vapor to a saturated liquid.

An expansion valve 358 can operate as a flow control device within the cooling cycle 350. The expansion valve 358 controls the amount of the second working fluid 354 flowing from the condenser 356 to an evaporator 360. The high-pressure liquid second working fluid 354 exiting the condenser 356 enters the expansion valve 358, which allows a portion of the second working fluid 354 to enter the evaporator 360. The expansion valve 358 allows a pressure drop in the second working fluid 354, thus expanding to a lower pressure prior to entering the evaporator 360. In the illustrated embodiment, the second working fluid 354 experiences a pressure drop within the expansion valve 358 and a corresponding saturation temperature drop from 27° C. to less than 6.5° C., allowing the second working fluid 354 to exit the expansion valve 358 at a temperature less than 6.5° C.

The evaporator 360 receives the second working fluid 354 from the expansion valve 358 and allows expansion to a combined liquid and vapor state, with more liquid that vapor. The evaporator 360 is configured to absorb heat from a cooling fluid to the second working fluid 354, thereby generating the desired cooling effect by reducing the temperature of the circulating cooling fluid. In the illustrated embodiment, the circulating cooling fluid is the fluid 104 (e.g., ammonia) from the cooling cycle 100 of FIG. 1.

In the illustrated embodiment, the evaporator 360 can receive the circulating cooling fluid 104 at a 27° C. and 140 PSIG and discharge the circulating cooling fluid 104 at 6.5° C. The remaining portions of the cooling cycle 100 can be seen in FIGS. 1 and 3. The evaporator 360 allows the second working fluid 354 to absorb heat from the circulating cooling fluid 354 prior to reentry into the compressor 352.

Figure 5:
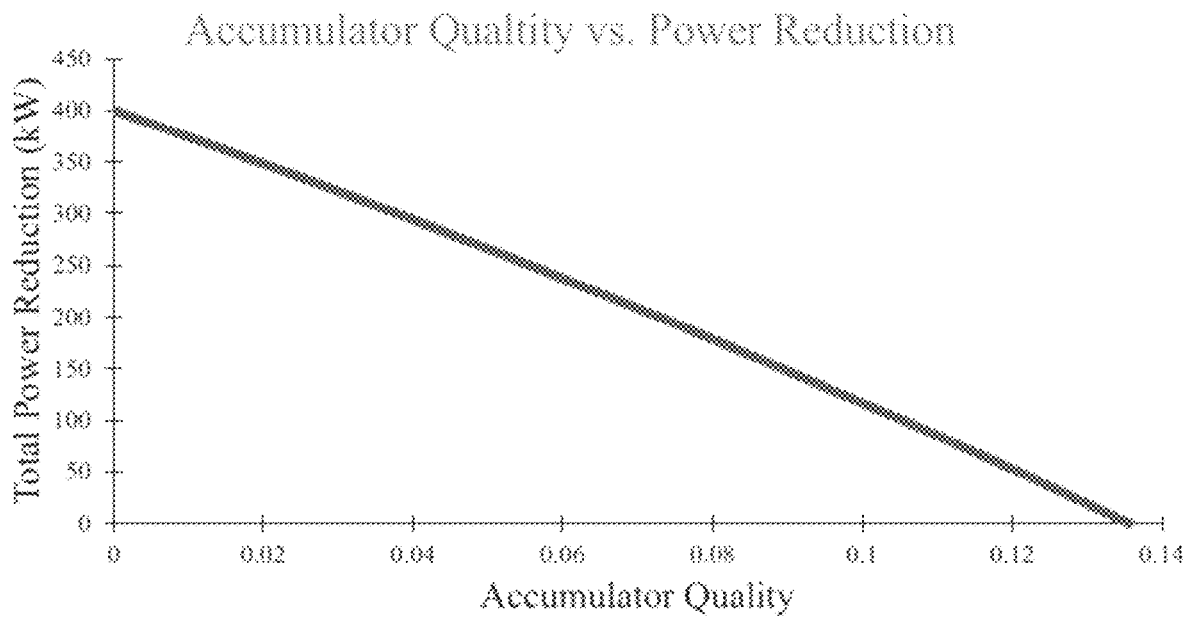
FIG. 5 is a graph of Accumulator quality versus power reduction (kW)
Figure 6:
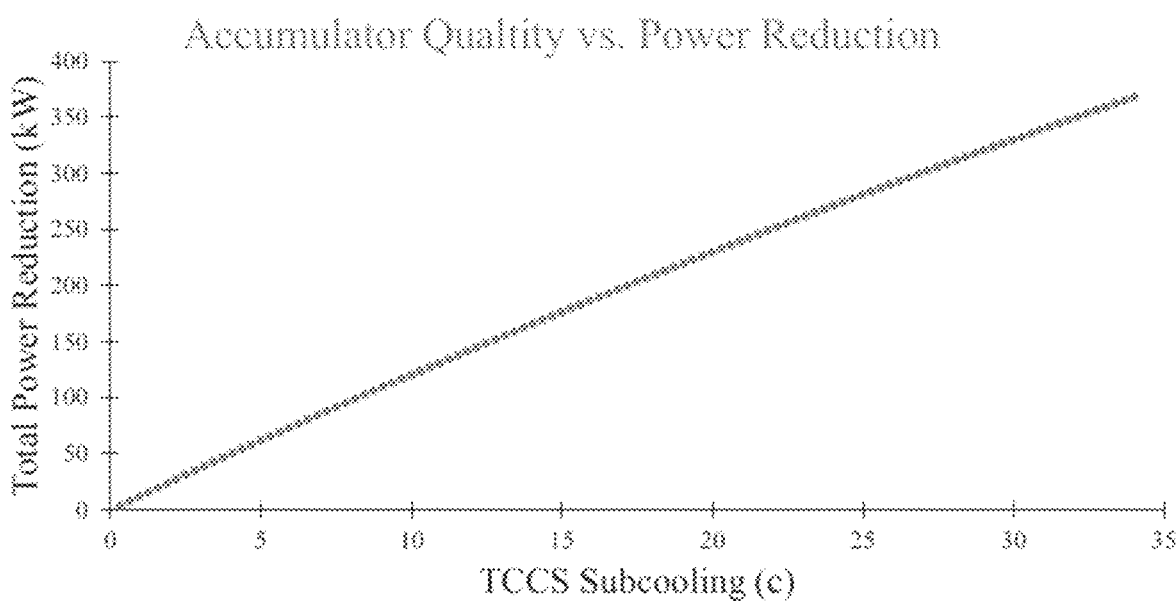
FIG. 6 is a graph of Accumulator quality versus power reduction (kW)

FIGS. 5 and 6 are graphs illustrating that increasing ammonia liquid, and reducing ammonia vapor, by way of integration of the turbo-compressor system 200 into the ammonia-cooling loop 100 reduces compressor work. More particularly, FIG. 5 is a graph of Accumulator quality versus power reduction (kW), and FIG. 6 is a graph of Accumulator quality versus power reduction (kW).

As previously described, the fluid 104 leaving expansion valve 110 is a mixture of liquid and vapor. The fluid upstream of valve 110 is all liquid, and the percentage of vapor leaving the valve 110 is dependent on the entering liquid temperature. The higher the entering liquid temperature, the higher the fraction of vapor leaving the valve 110. The vapor portion of the fluid 104 does not participate in the refrigeration process and is simply recompressed. Thus, if the liquid temperature is lowered prior to entering the valve 110, less vapor has to be recompressed in the compressor 102. In a certain instance, with a compressor power of 2.95 MW, the vapor fraction exiting valve 110 is 13.6%, as indicated in FIG. 1.

FIG. 3 illustrates that if the temperature of the liquid entering valve 110 is reduced from 27° C. to 6.5° C., then the vapor fraction exiting the valve 110 reduces to 6.2%. As a result of less vapor needing to be recirculated, the compressor work is reduced to 2.72 MW, yielding an energy savings of 230 kW.

FIG. 5 shows the effect of reducing the vapor quality entering the accumulator 112. At 0.06 (i.e., 6.2%), the power reduction is about 230 kW. Reducing the vapor fraction existing valve 110 to 0 reduces the compressor power by 400 kW. FIG. 6 shows the effect of subcooling the liquid entering valve 110 below 27° C. For example, subcooling by 20.5 C (i.e. from 27° C. to 6.5° C.) yields a compressor power reduction of 230 kW. This is the same because reducing the liquid temperature entering the valve by 20.5° C. yields an outlet vapor fraction of 0.062. Similarly, cooling the fluid to -9° C. (35° C. subcooling) yields an outlet vapor fraction of 0 and a compressor power reduction of nearly 400 kW.

Figure 7:
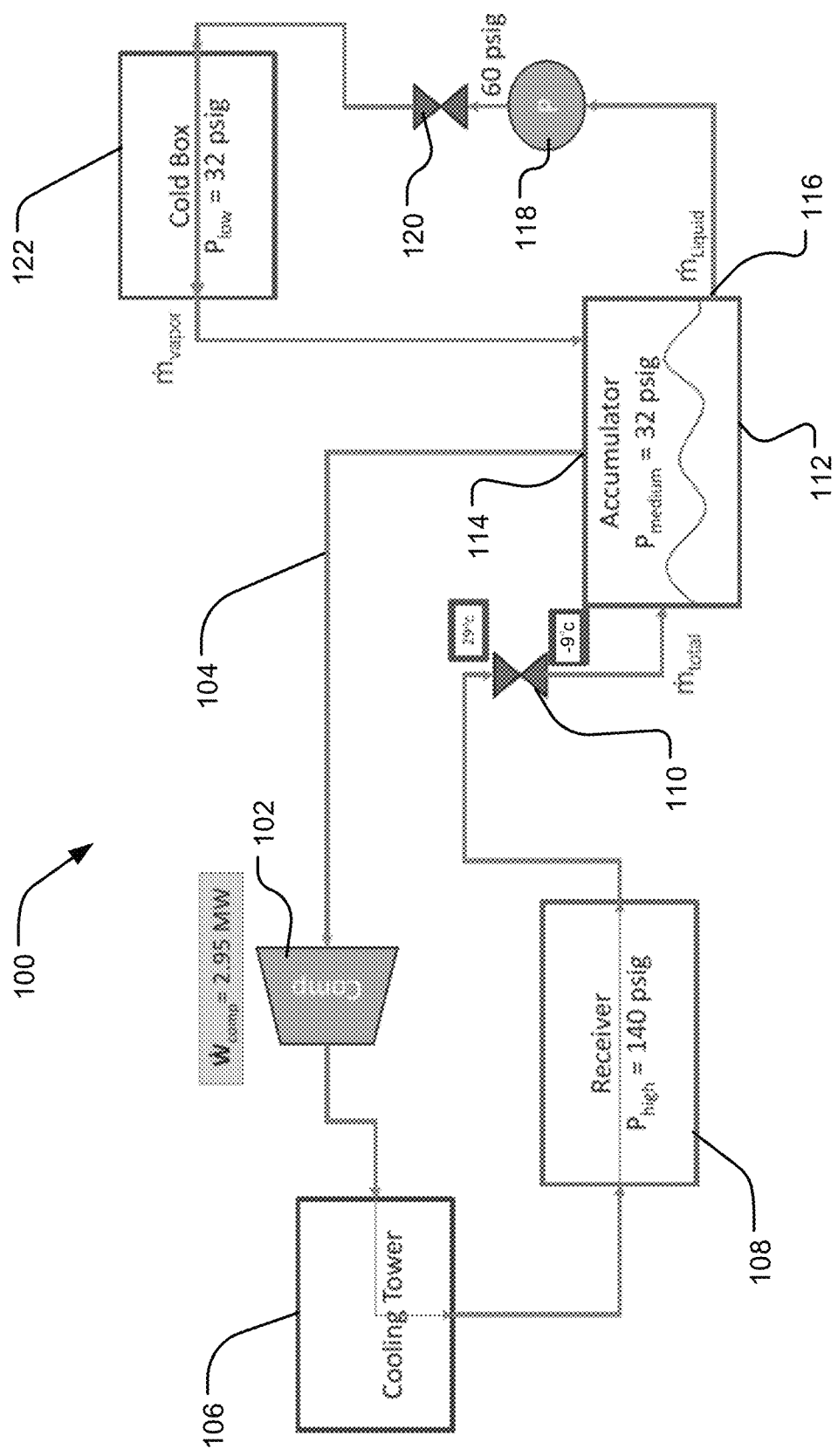
FIG. 7 is a diagrammatic view of another ammonia cooling loop in accordance with the present disclosure.

FIG. 7 illustrates another instance of a cooling system 100, such as an ammonia-cooling loop in a refrigeration system of a food or beverage industrial plant. The cooling system 100 in FIG. 7 is similar to the system 100 in FIG. 1, except the fluid 104 exiting the cold box 122, in FIG. 7, is re-routed back to the accumulator 112. Additionally, the vapor outlet 114, in FIG. 7, is routed directly to the compressor 102 without mixing at the valve 124. As seen in FIG. 7, the mass flow rate of the liquid fluid 104 exiting the accumulator 112 is the same as the mass flow rate returning to the accumulator 112 from the cold box loop.

Figure 8:
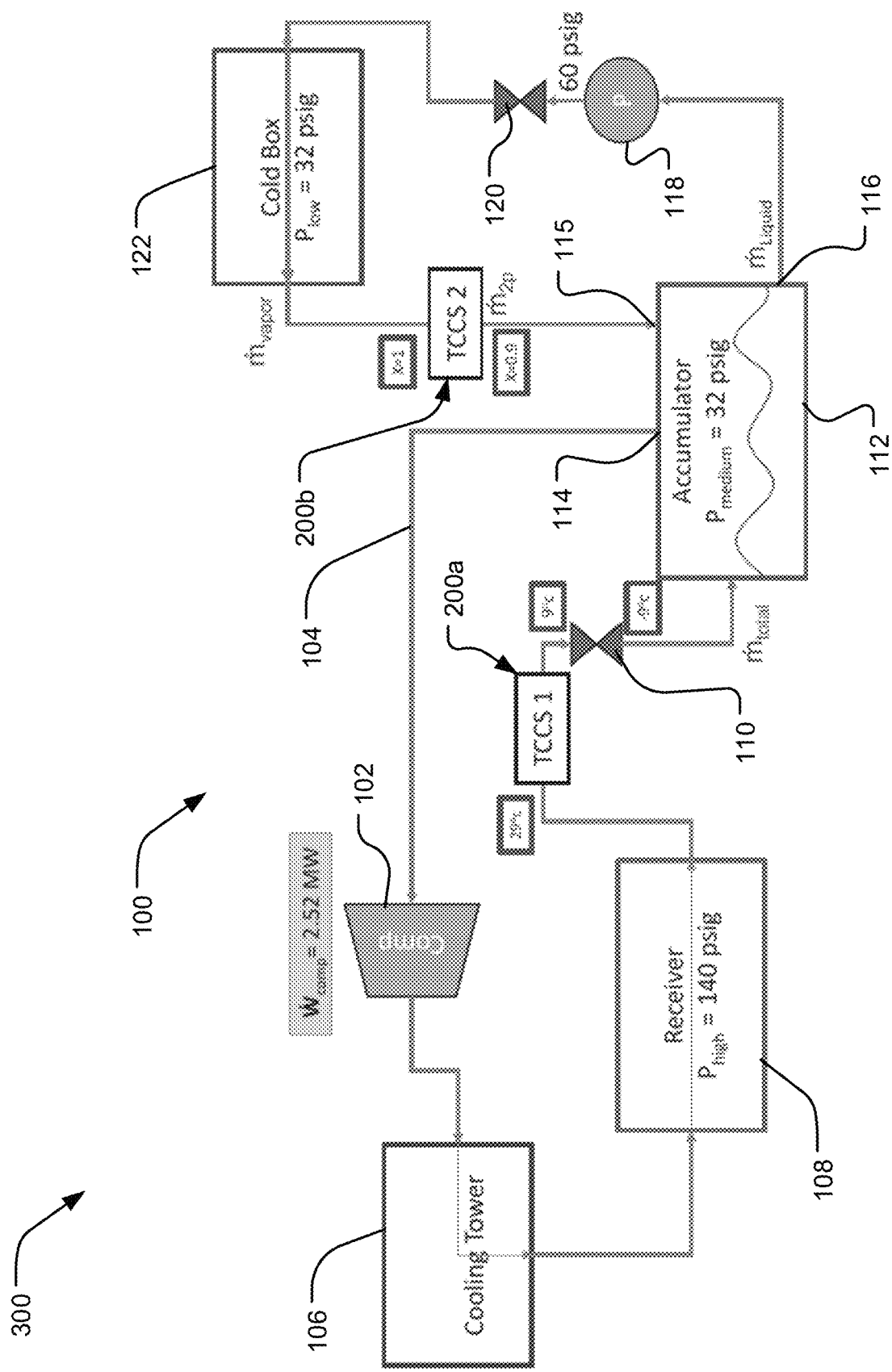
FIG. 8 is a diagrammatic view of an example embodiment of a cooling system, such as the ammonia cooling loop of FIG. 7, implementing a turbo-compressor of FIG. 2.

FIG. 8 illustrates an efficient cooling system 300 that integrates two turbo-compression cooling systems 200a, 200b into the ammonia cooling system 100 of FIG. 7. The turbo-compression cooling systems 200a, 200b may be the same system 200 illustrated in FIG. 2. As seen in FIG. 8, the first turbo-compression cooling system 200a is positioned within the cooling system 100 between the receiver 108 and the expansion valve 110. The fluid 104 line of the system 100 may be cooled by the evaporator of the turbo-compression cooling system 200a, as similarly described with reference to FIG. 4. The fluid 104 may enter the turbo-compression cooling system 200a at a first temperature of about 29° C., and exit the system 200a at a second temperature of about 9° C. The fluid 104 may then travel through the expansion valve 110 and decrease in temperature to about -9° C. before entering the accumulator 112. The accumulator 112 has a vapor outlet 114 for re-circulating vapor fluid 104 back to the compressor 102, a liquid outlet 116 for routing the liquid fluid 104 through a pump 118, and a valve 120, and to the cold box 122 for cooling a product. The fluid 104 exits the cold box 122 as a vapor and enters the second turbo-compression cooling system 200b where the fluid 104 is cooled by the evaporator of the system 200b before entering the accumulator 112 through a vapor inlet 115.

The system 300 of FIG. 8 is more efficient with the integration of the two turbo-compression cooling system 200a, 200b. The compressor 102 of the system 300 in FIG. 8 operates on 2.52 megawatts ("MW") of power, whereas the compressor 102 of the system 100 in FIG. 7 operates on 2.95 MW of power. As seen by a comparison of FIGS. 7 and 8, the temperatures drop via the expansion valve 110, in FIG. 7, is 29° C. to -9° C., whereas the temperature drop via the expansion valve 110, in FIG. 8, is 9° C. to -9° C.

II. Diesel Generators and Turbo-Compression Cooling System

The turbo-compression cooling system 200 of FIG. 2 can be integrated into additional systems as described herein. For example, the turbo-compression cooling system 200 can be applied in the context of diesel generator systems (e.g., marine diesel engines) by utilizing the waste heat to improve fuel economy. Low temperature engine jacket water, lubrication oil, and aftercooler air from diesel generators are largely untapped streams of thermal energy. However, their utilization circumvents many operational challenges associated with exhaust gases. For example, variable and high exhaust gas temperatures cause thermal cycling of heat exchangers, whereas low temperature engine coolant rarely exceeds 90° C. However, this low temperature makes increasing system efficiency by 10% or greater with a volume increase less than or equal to 4% very difficult due to the large heat exchanger volumes necessary to maximize energy conversion. Such large heat exchangers are unlikely to fit within the space constraints on a ship, for example. Nevertheless, if these targets can be achieved by utilizing only low temperature heat, then these ships will be able to implement additional systems that are offset by the efficiency gains of the generators.

Disclosed herein is a turbo-compression cooling system ("TCCS") driven by low temperature waste heat capable of increasing fuel efficiency of diesel generators by at least 10%. The TCCS is capable of operating within the small footprint associated with the environment. To begin, reference is made to FIGS. 9A and 9B, which illustrate, respectively, an overhead and an isometric view of a diesel generator ("DG") 500 positioned adjacent an existing low temperature heat exchanger 502 (e.g., shell and tube heat exchanger), and also positioned adjacent a TCCS 504 that will replace the existing low temperature heat exchanger 502. The TCCS 504 utilizes low temperature waste heat from DG 500 to generate a useful cooling effect for ship loads (chilled water), and replaces existing large, low-temperature heat exchangers 502. Based on efficient conversion of waste heat with compact, efficient components, the TCCS 504 may generate enough chilled water to enable a >10% fuel efficiency increase to the DG 500, while still limiting the total weight and volume increase to <4%. It is noted that while the present disclosure references diesel generators, the systems described herein are also applicable to other types of generators without limitation. As such, the diesel generators ("DG") described herein may refer generically to any type of generator 500. Exemplary fuel for the generator 500 may be diesel, natural gas, hydrogen, liquefied natural gas, propane, and fuel oil, among other fuels.

The DG's 500 provide electricity to various types of ships. Conventionally, the DG's are cooled via jacket water, and lubricating oil. These are sources of waste heat from the DG's. Additional sources of waste heat include exhaust gas; however, using the waste heat in the jacket water and lubricating oil avoids the challenges associated with recovering waste heat from the exhaust gas stream. That said, the exhaust gas is a much higher temperature than the other waste heat streams. While the feasibility of recovering the heat from the exhaust gas is more complicated than recovering waste heat from the jacket water and lubricating oil, it is feasible in certain instances given its relatively high temperature. One challenge to the feasibility of using the exhaust gas as a waste heat source is that it undergoes significant temperature variations (425° C. to 25° C.) and there is exposure to acid contaminants. Furthermore, adding additional heat exchangers imposes additional backpressure on the diesel engine, which may negatively impact engine performance. For these reasons, among others, certain TCCS 504 described herein utilize only the jacket water and lubricating oil as a waste heat source, while others include the exhaust gas as a waste heat source. That is, less than all of the available waste heat streams may be utilized in order to provide efficiency gains to the DG 500 while fitting the overall system within the available footprint within the ships.

Figure 10:
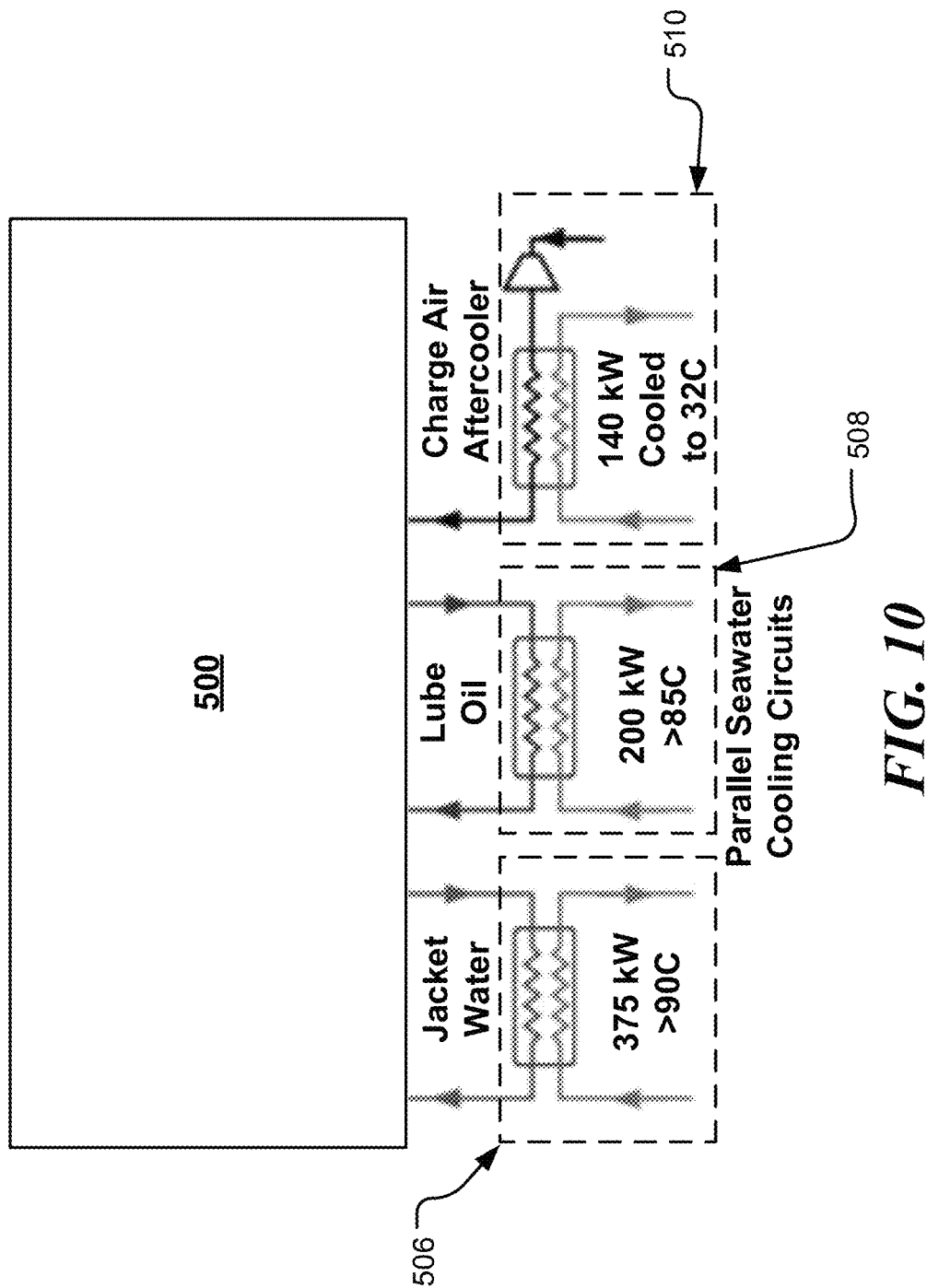
FIG. 10 is an isometric view of a diesel generator with various streams of waste heat.

Finally, adding a heat recovery device to the exhaust stream will significantly increase the footprint of any system because the heat exchanger is not normally present, as the exhaust heat is simply exhausted to the ambient. In contrast, adding additional pressure drop to the coolant lines will not negatively impact engine performance or significantly increase the footprint of the system. To that end, the TCCS 504 described in this section aims to capture this low-grade heat to achieve a ~10% fuel economy improvement, while having a less than 4% size and weight penalty. FIG. 10 illustrates the DG 500 with a schematic of the conventional cooling loops involving the jacket water in a first cooling loop 506, the lube oil in a second cooling loop 508, and an air cooling system 510 for the aftercooler air.

Figure 11:
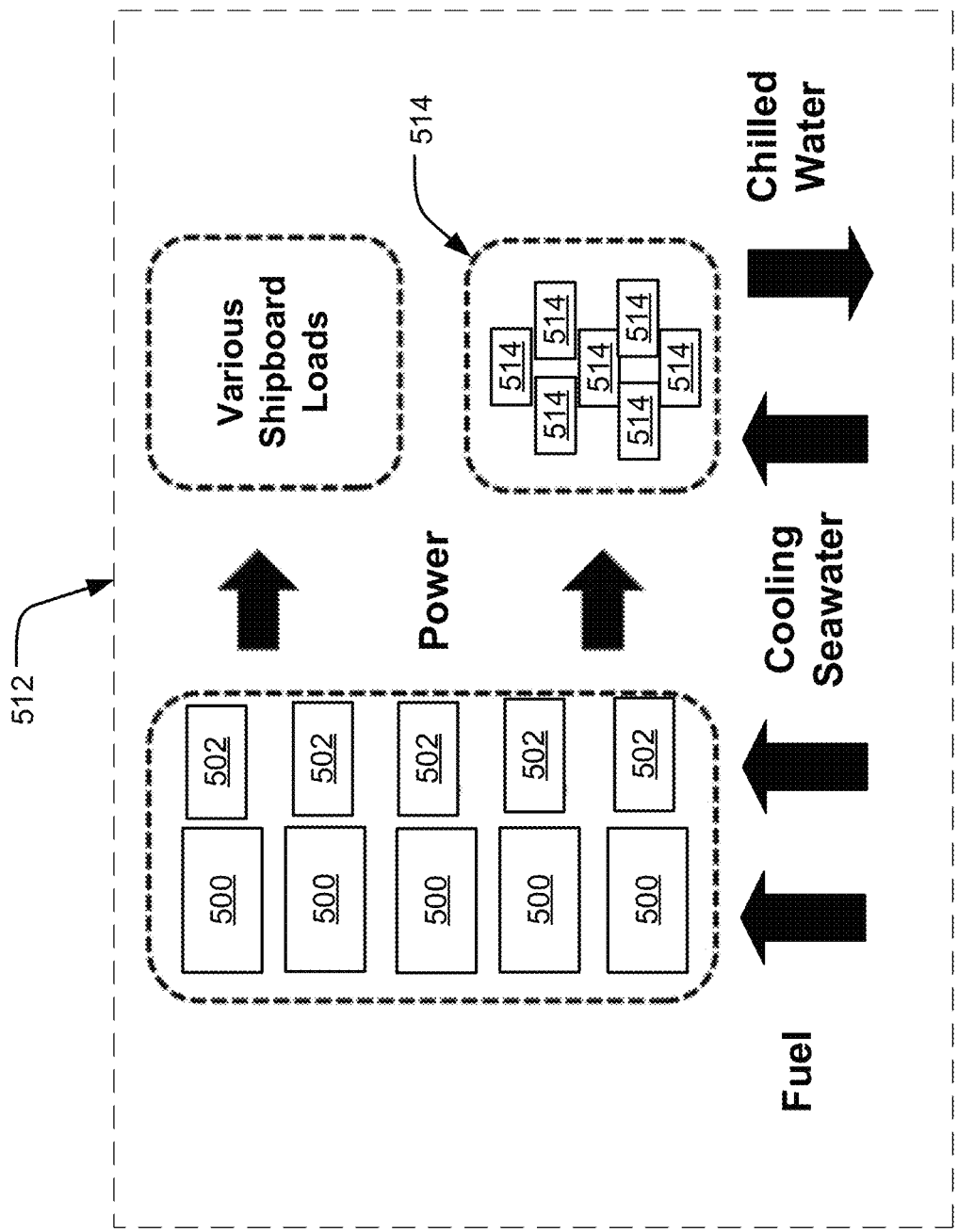
FIG. 11 is a diagrammatic view of an exemplary electrical power distribution system on a large ship.

FIG. 11 shows a diagram of the electrical power distribution system 512 of an exemplary ship. Each ship may include multiple DGs 500 that provide electric power for all of the systems on the ship. Each DG may have a rated capacity of about 2.5 MW and its own independent cooling system 502 (e.g., shell and tube heat exchanger). A closed loop of freshwater is used to remove heat from the engine jacket water and lubricating oil in a titanium heat exchanger. Then, the closed freshwater loop is cooled using ambient seawater that is co-located with the DG. For space conditioning, this exemplary ship may have direct seawater-cooled vapor compression chillers 514. The seawater may be used to cool the R134a working fluid in a shell and tube condenser before the working fluid is throttled to a lower pressure and temperature. To get from diesel fuel to useful chilled water cooling, there are four energy conversion steps (chemical-mechanical-electrical-mechanical) where each step has an efficiency penalty. First, the combustion of fuel in the diesel engine produces mechanical work, which is converted to electrical work in the generator. To produce useful cooling, the electrical work is then converted back to mechanical work to drive the compressor on the vapor compression chillers 514. Elimination of these four energy conversions can result in significant efficiency improvements to ship systems.

FIG. 10 provided an overview of the low temperature waste heat sources that the proposed system can capture. At an average loading condition (57%), there may be about 3,500 kW of fuel energy input with 675 kW of recoverable low grade waste heat, where 375 kW is in the jacket water, 200 kW is in the lubricating oil, and 100 kW is in the aftercooler air stream (when cooled to 80° C.).

The jacket water inlet temperature is limited to 90° C. and the jacket water flow rate should be maintained such that the change in temperature is never greater than 11° C. On an exemplary ship and on a per engine basis, the compressor power draw is approximately 14% of the total power provided by each engine. Therefore, if this electrical power requirement can be substantially reduced (or potentially eliminated), then the overall system efficiency can be dramatically improved.

Figure 12:
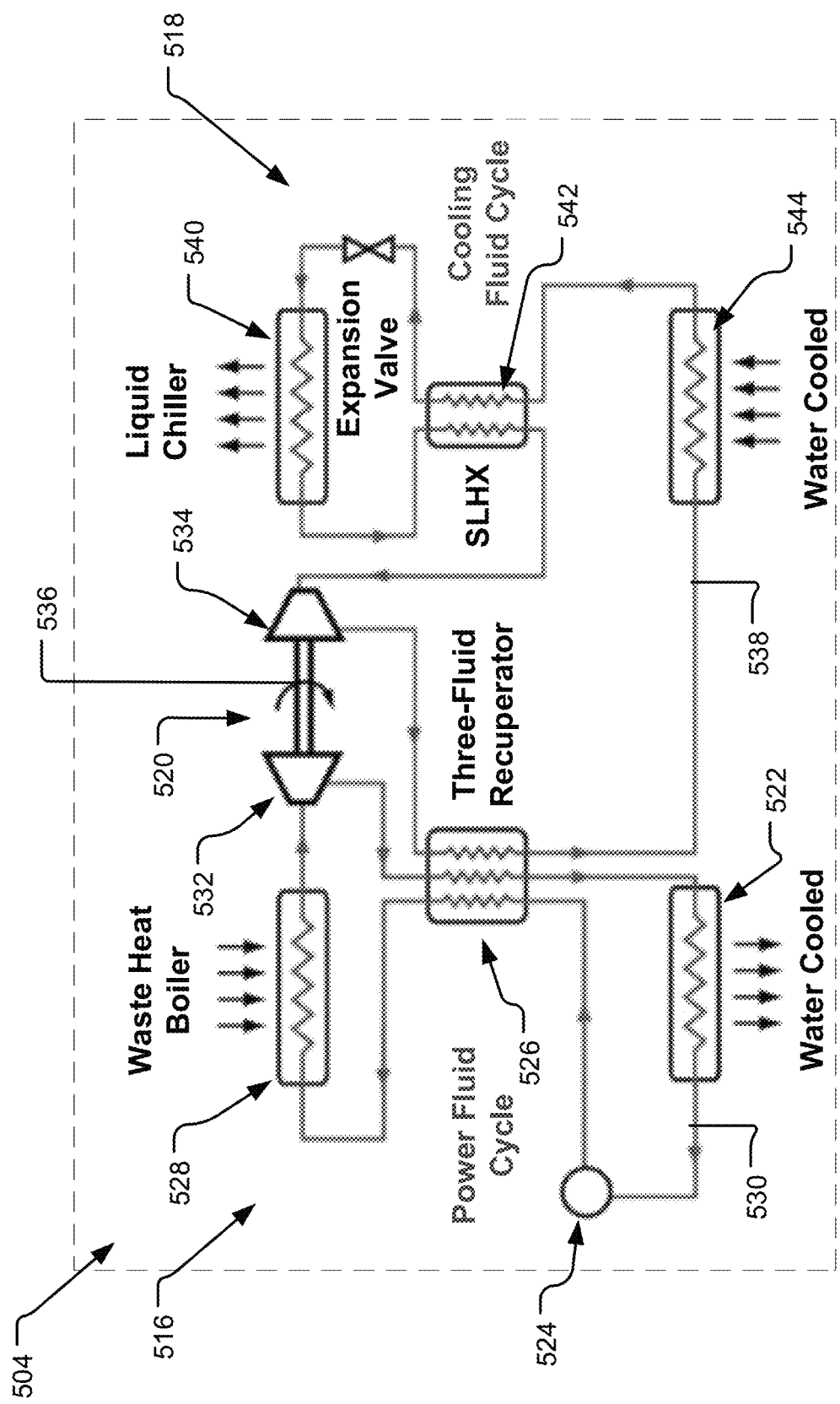
FIG. 12 is a diagrammatic view of an exemplary turbo-compression cooling system for use with the diesel generator.

As described herein the TCCS 504 may be integrated with the DG 500 to convert the normally wasted low temperature heat (80 to 90° C.) from DGs 500 into cooling to offload electrical requirements from the chillers 514 that provide chilled water. As shown in FIG. 12, which is a diagrammatic view of the TCCS 504, the TCCS 504 consists of two integrated thermodynamic cycles, a power cycle 516 and a cooling cycle 518, that are linked by a high efficiency turbo-compressor 520 and compact heat exchanger technology. In the power cycle 516, subcooled liquid 530 leaving the condenser 522 is pressurized by a low power pump 524 and is subsequently heated to a superheated vapor in a three fluid recuperator 526 and then a waste heat boiler 528. As mentioned, the waste heat boiler 528 is supplied heat via the jacket water and lubricating oil that is used to cool the diesel generators. In particular, the jacket water and lubricating oil provide heat to the fluid in the power cycle 504 after it has been heated by the diesel generators. By rejecting the heat from the jacket water and lubricating oil to the fluid in the power cycle 504, the jacket water and lubricating oil is thereby cooled, and converting this heat to cooling increases the efficiency of the overall system, generally.

As seen in FIG. 12, the recuperator 526 improves the efficiency of the power cycle 516 and captures some of the excess heat in both the power cycle 516 and cooling cycle 518. In particular, the subcooled liquid 530 is heated by both discharge lines from the turbine 532 and the compressor 534. After exiting the waste heat boiler 528 of the power cycle 516, the vapor 530 is then expanded to a low pressure in a centrifugal turbine 532 that supplies mechanical power directly to the compressor 534 via a shaft 536, which drives the cooling fluid cycle 538. After exiting the turbine 532, the power cycle fluid 530 is subcooled via the three fluid recuperator 526 and the condenser 522.

For the cooling fluid cycle 518, superheated vapor 538 exiting the evaporator 540 is first heated by the cooling cycle condenser discharge in a suction-line heat exchanger ("SLHX") 542. This pre-cools the outgoing fluid 538 from the condenser 544, which reduces the inlet enthalpy in the evaporator 540 and substantially improves the performance of the cooling cycle 518. The vapor 538 exiting the SLHX 542 is then compressed to the condenser pressure by the compressor 534. By using the SLHX 542, the compressor 534 discharge temperature increases significantly. However, this extra heat can be rejected to the power cycle 516 in the three fluid recuperator 526. Although preheating the compressor inlet can increase the specific work of the compressor 534, the combination of increased power generated by the turbine 532 and reduced mass flow from the SLHX 542 allows the overall system COP to be high. Incorporation of a SLHX 542 also improves the operational stability of the cooling cycle 518 by preventing liquid droplets from entering the compressor 534. Once the cooling fluid 538 is liquefied in the condenser 544 and the SLHX 542, it is expanded to low pressure and passed into the evaporator 540, where the cooling effect is generated.

One of the challenges with low temperature waste heat recovery is that the system must operate very close to the heat source and heat sink temperatures to have a high heat recovery efficiency. As the saturation temperature of the working fluid gets closer to the source/sink temperature, the heat transfer surface area must increase to accommodate for the lower thermal driving potential. Accordingly, compact heat exchanger technology is utilized to keep the footprint of the TCCS small while still being able to operate very near to the source and sink temperatures. In the TCCS 504 shown in FIG. 12, there are six heat exchangers: power cycle boiler 528 and condenser 522, cooling cycle condenser 544, evaporator 540, SLHX 542, and recuperator 526. Conventional technologies for these components include: plate and frame heat exchangers; and shell and tube heat exchangers. However, both of these options are large, which makes it challenging to meet volume requirements. In contrast, compact heat exchangers are a fraction of the size and mass.

It is noted that the system 504 is FIG. 12, may be utilized to many industries and applications. That is, the TCCS 504 is not limited to improving the performance of marine diesel generators. The TCCS 504 may be utilized in any application where there is an availability of waste heat sufficient to be utilized in the waste heat boiler 528 of the system 504. One particular advantage of the TCCS 504 is that it is operational with low temperature waste heat as described herein.

Figure 13:
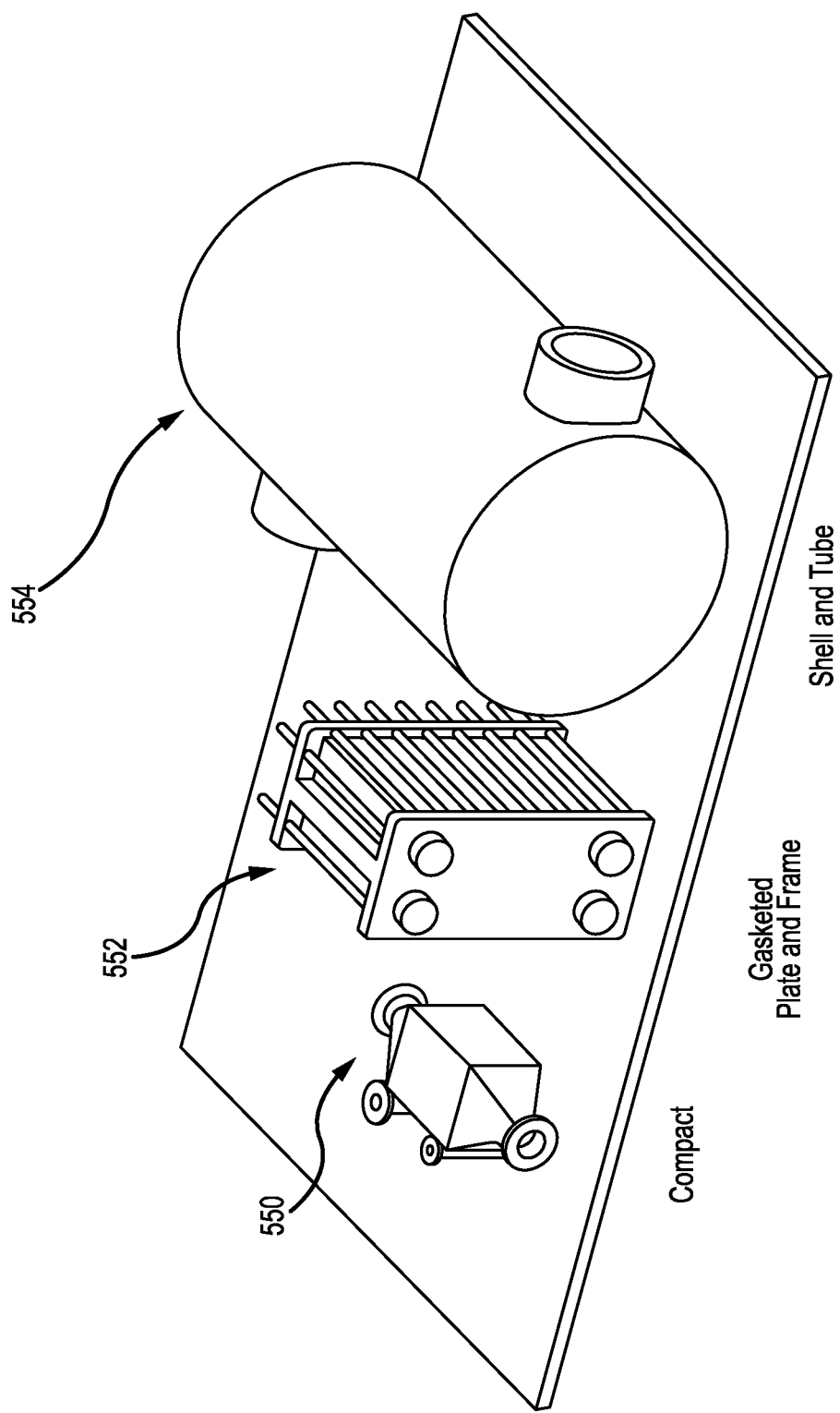
FIG. 13 is an isometric view of various heat exchangers showing their relative sizes.

FIG. 13 depicts an isometric view of three heat exchangers: a compact heat exchanger 550; a gasketed plate and frame heat exchanger 552; and a shell and tube heat exchanger 554. The figure shows relative size comparison between these three heat exchangers at the same performance characteristics. That is, the shell and tube heat exchanger 554 and the gasketed plate and frame heat exchanger 552 must be much larger than the compact heat exchanger 550 in order to perform similarly. The miniscule footprint of the compact devices stems from their high surface area to volume ratio, and compact heat exchanger 550 is capable of meeting both the performance and space requirements of the proposed system.

Figure 14:
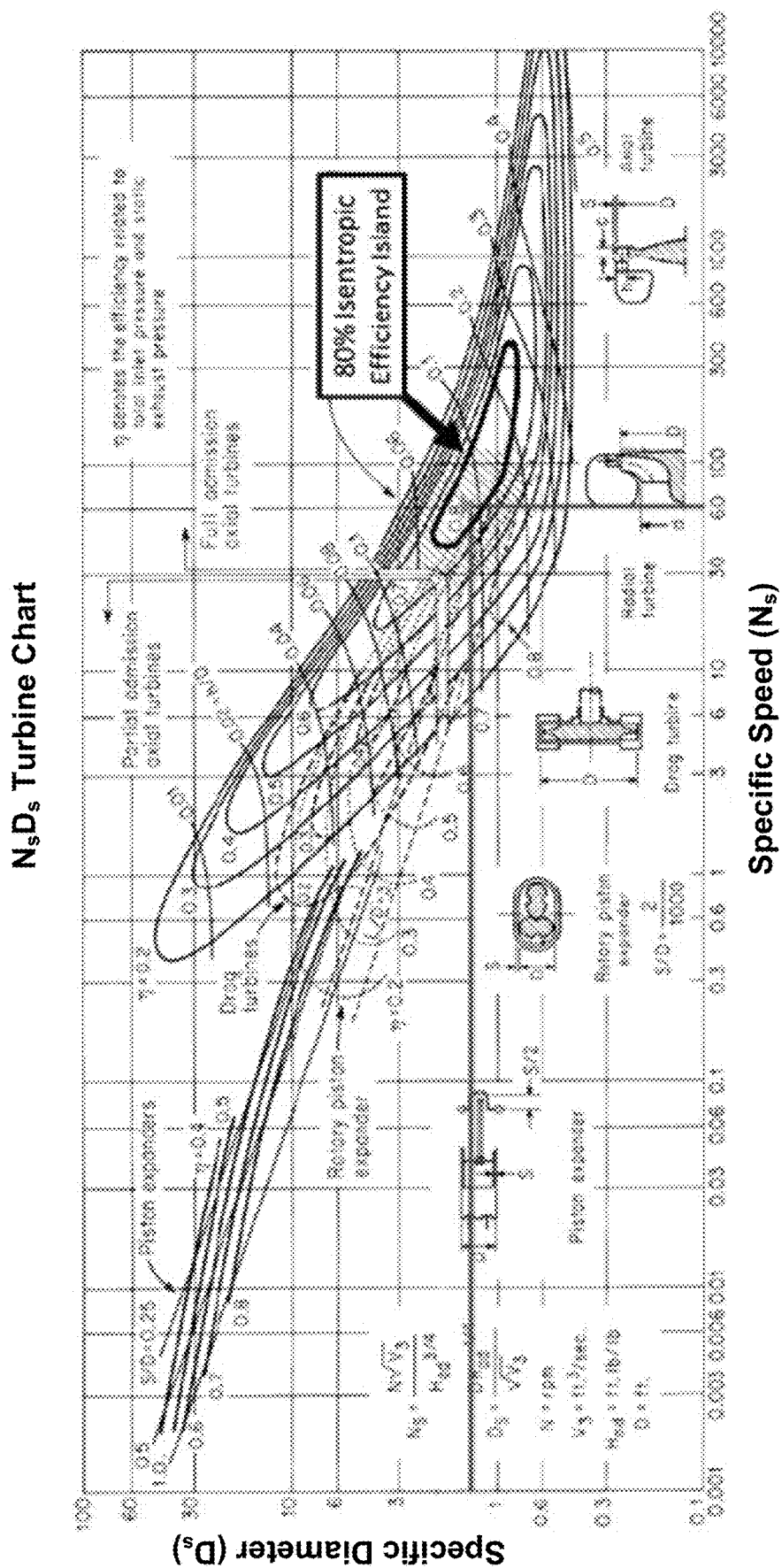
FIGS. 14 and 15 are empirical Cordier diagrams documenting regions where well-designed centrifugal and axial turbomachinery achieve high efficiency.
Figure 15:
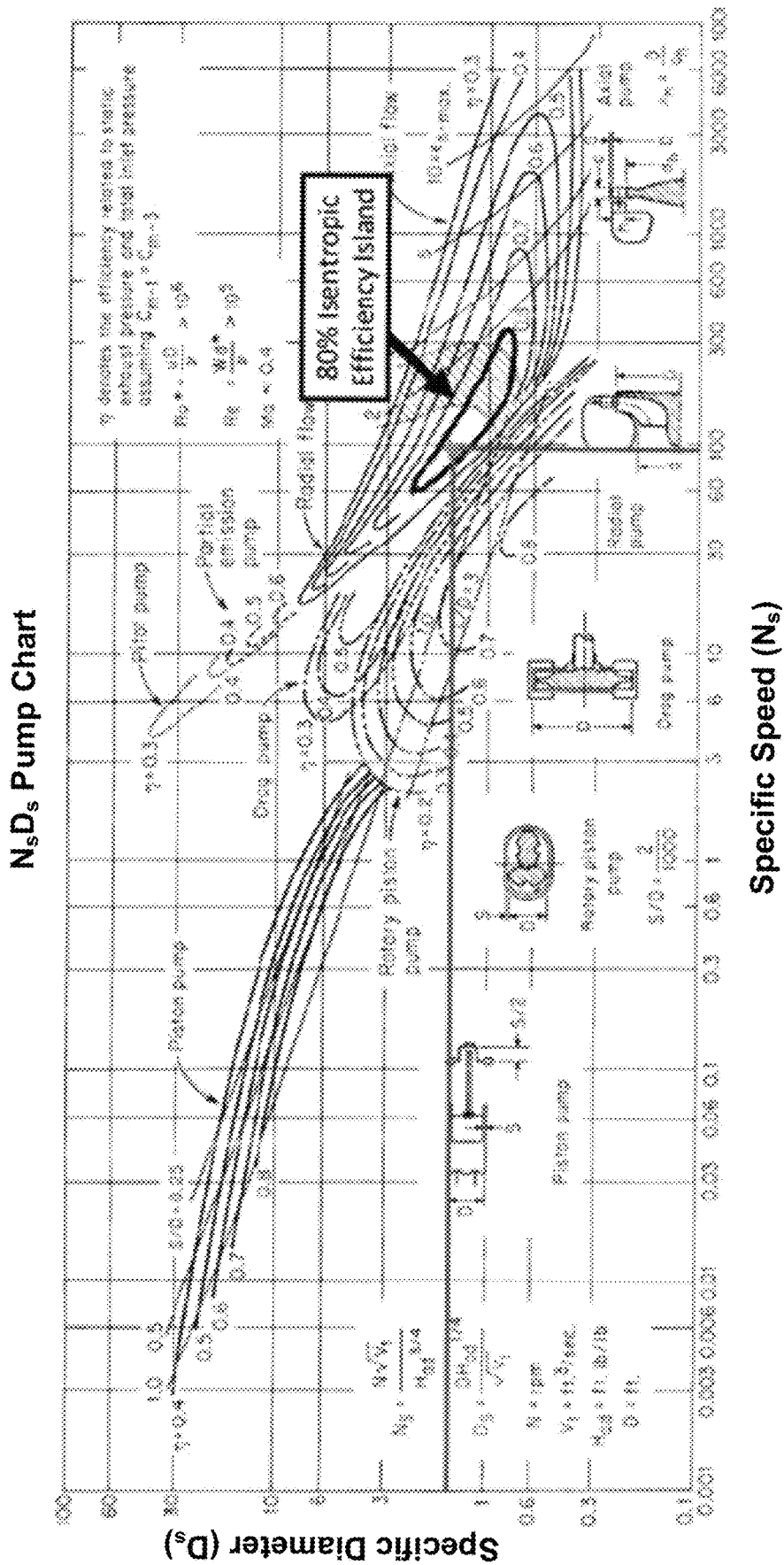

The compressor and turbine isentropic efficiencies of the TCCS are >80%. FIGS. 14 and 15 shows empirical Cordier diagrams that documents regions where well-designed centrifugal and axial turbomachinery can achieve this high efficiency. FIG. 14 shows an efficiency chart for Turbines and FIG. 15 shows an efficiency chart for Pumps. For example, the maximum efficiency for turbines and compressors is obtained at specific speeds ($N_s$) between 50 and 300, and specific diameters ($D_s$) between 0.6 and 2 where:

$$N_s = \frac{N\sqrt{V}}{\Delta H^{0.75}},$$

$$D_s = \frac{D\Delta H^{0.25}}{\sqrt{V}}$$

The specific speed of the turbine is proportional to the rotational speed (N in units of RPM) and the square root of the volumetric flow rate (V in units of $ft^3 s^{-1}$) and inversely proportional to the enthalpy rise or drop (H in units of ft. lbf $1bm^{-1}$) to the 0.75 power. The volumetric flow rate for compressors and turbines are calculated at the inlet and outlet, respectively. Centrifugal compressors and turbines typically operate with efficiencies in excess of 80% at specific speeds below 120 and 70, respectively. Above these values, radial turbomachines are extremely difficult to manufacture due to their small size (i.e., small tip clearances) and high rotational speeds. For system simplicity, it is ideal for the actual rotational speeds for the power and cooling cycle fluids to be the same. For power plant cooling, using the same fluid is a challenge because the temperature lifts for each of these cycles is substantially different, and the $\Delta H$ is significantly larger for the turbine if the same fluid is utilized in the compressor.

In contrast, for the proposed liquid chiller system, the temperature lifts for the two cycles are similar, and the same fluid can be used. However, because turbine exit density is larger than the compressor inlet density for the same fluid, this causes the turbine to have a smaller specific speed (Ns) than the compressor, and care must be taken to select a fluid that falls in the 80% efficiency island on the Cordier diagrams for both components. As shown in FIG. 14, calculations indicate that both can operate in this region with R134a.

Figure 16:
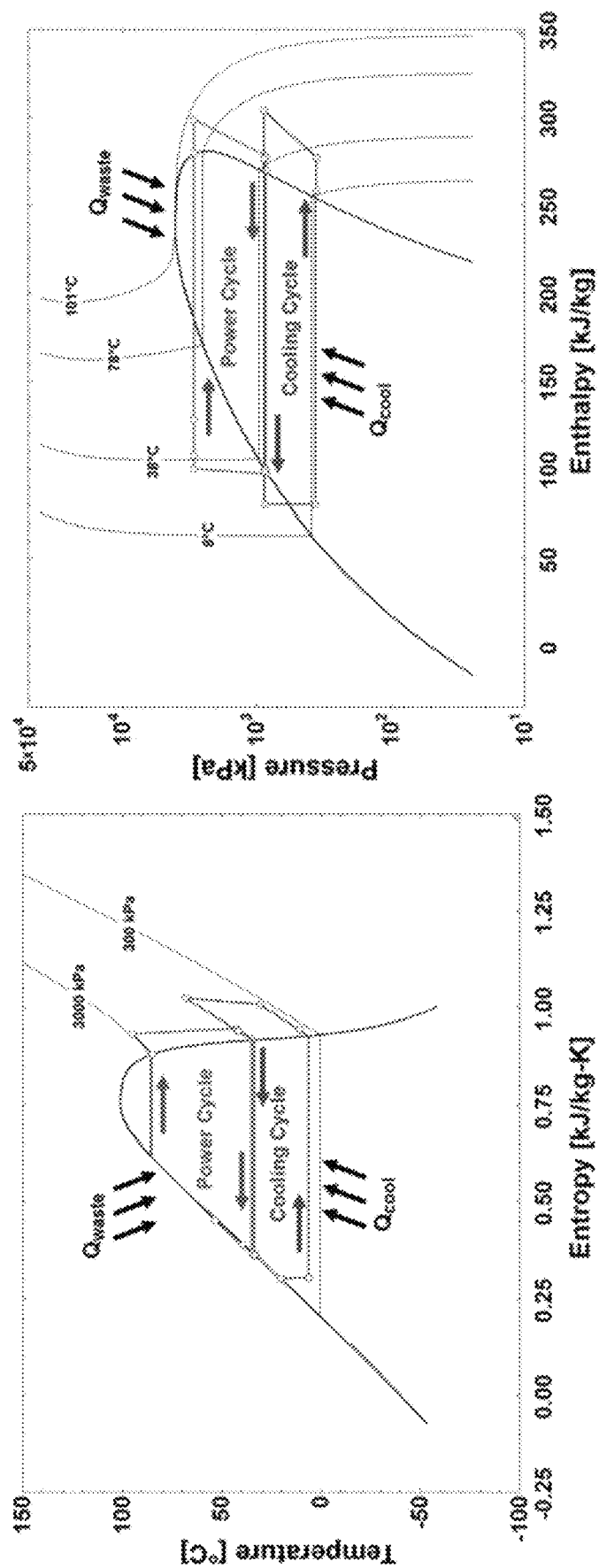
FIG. 16 are graphs of representative system calculations that show high system COP for a turbo-compression cooling system using R134a achieved at nominal seawater and waste heat conditions.

FIG. 16 shows the shows the temperature-entropy (T-s) pressure enthalpy diagram for a TCCS that generates 463 kW of supplemental chilled water by utilizing the low temperature waste heat in the engine. At this condition, the targeted mass flow rate for power and cooling cycles are 3.37 kg $s^{-1}$ and 2.53 kg $s^{-1}$, respectively. Using the compressor inlet and turbine outlet densities of 15.5 kg $m^{-3}$ and 39.9 kg $m^{-3}$, respectively, the specific speeds of the compressor and turbine are 93 and 59, respectively, at a shaft rotation of 30,000 rpm. For specific diameters of 1.7 and 1.8, this places both the compressor and turbine well within the 80% efficiency island. Moreover, tip diameters for the turbine and compressor are approximately 101 mm and 132 mm, which are close to the same size as the compressor (80 mm) and turbine (122 mm) used in the prototype under development. Moreover, the proposed system will eliminate unnecessary energy conversions to reduce efficiency penalties.

Figure 17:
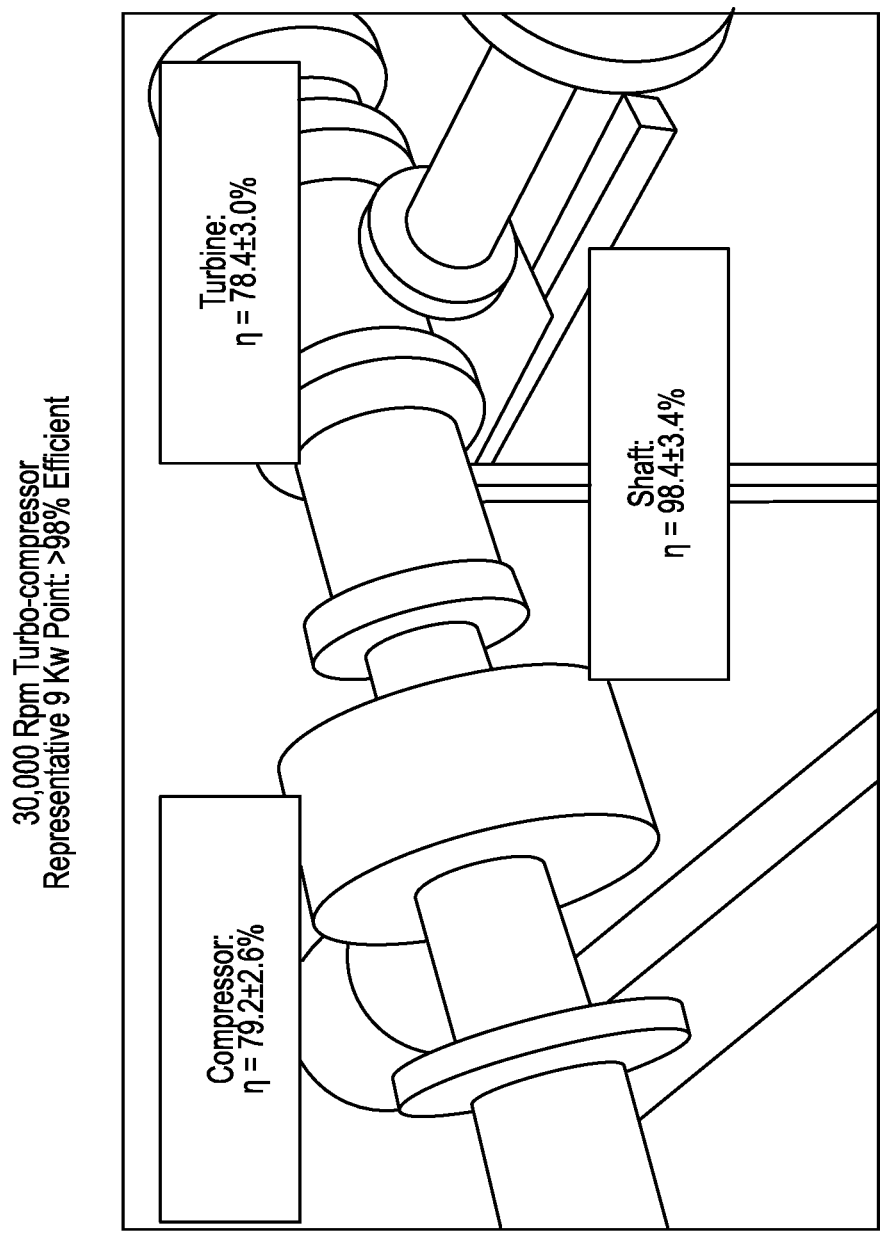
FIG. 17 is an isometric view of a turbo-compression cooling system with direct coupling of the turbine and compressor.

One of many features of the TCCS is there are no mechanical-electrical-mechanical losses to power the compressor, which substantially improves system efficiency. Waste heat from fuel combustion is used to produce mechanical power in an organic Rankine cycle (ORC), which is directly used to drive a compressor on a vapor compression machine, completely bypassing the mechanical-electrical-mechanical conversion losses that currently plague the ship cooling systems. For example, a mechanical transmission efficiency >98% has been measured experimentally for the ~30,000 rpm TCCS shown in FIG. 17. Direct mechanical coupling of the turbo-compressor avoids unnecessary energy mechanical-to-electrical penalties, yielding much higher power transmission efficiencies than electrical ORC and vapor compression systems. This power transmission is unachievable with electrically driven compressors. Similarly, if an organic Rankine cycle were to produce electricity instead of driving the compressor directly, there would be additional mechanical to electrical losses near 10%.

Another feature of the TCCS is heat integration. As shown in FIG. 16, the turbine discharge temperature is hotter than the condenser saturation temperature, thus allowing the former to pre-heat the fluid before it enters the waste heat boiler. In addition, the SLHX in the cooling cycle uses the cold evaporator discharge to pre-cool the expansion valve inlet, thus increasing the specific enthalpy change and, as a result, cooling duty in the chiller. This final key heat integration feature allows heat rejection from the relatively warm compressor discharge to the power cycle in the recuperator. In effect, this enables improved utilization of the waste heat, and increases the turbine power generation. For example, the power cycle efficiency (i.e., turbine power per unit waste heat) increases from 10.4% to 13.5% when the compressor discharge heat is added to it. Not only will state-of-the-art ORCs not be able to achieve this efficiency, ORCs will be further penalized by the mechanical-to-electrical efficiency. Thus, the TCCS described herein is an effective option for utilizing low temperature waste heat for cooling. In addition, it is without some of the challenges associated with other thermally activated cooling systems.

The combination of the TCCS's efficient turbo-compressor, highly effective heat exchangers, non-corrosive working fluid, and small footprint make it ideal for integration with a marine diesel generator set of a large ship. While there are commercially available thermally activated cooling systems, they suffer inherent limitations that make their use impractical compared to the TCCS described herein.

FIG. 18 shows a Table summarizing performance of the TCCS relative to state-of-the-art competing technologies, and shows that the TCCS has significant advantages over other thermally activated cooling systems. Unlike low COP solid-vapor adsorption that operates in a batch mode, the TCCS functions continuously without complex solid heat recuperation schemes between multiple sorption beds. Commercial absorption chillers consist of working fluid pairs, where one of the fluids is more volatile and serves as the primary cooling fluid. In ammonia-water systems, ammonia is the more volatile species, while water is the primary working fluid in LiBr-water absorption units. Not only are ammonia-water systems impermissible onboard ships due to the toxicity of ammonia, the corrosive nature of the ammonia-water mixture prohibits the use of lighter weight metals such as aluminum. Moreover, in addition to the considerable challenges with the solid LiBr remaining in solution at temperatures approaching 35° C., LiBr-water absorption systems are as equally as difficult to use with engine coolant heat because it requires the system to operate under vacuum. As a result, LiBr-water systems will require moderate to high vacuum pressures, which requires large heat exchanger volumes to compensate for sensitivity to pressure drop. Steam-chillers, which utilize water to generate mechanical power, also suffer from this same challenge. To overcome this difficulty, multi-effect absorption and steam-chiller systems rely upon higher waste heat temperatures, which are not suitable for ultra-low temperature sources. In contrast, the power and cooling cycles in the proposed system can be operated at reasonable pressures with R134a, which is non-corrosive, non-toxic, and non-flammable, which allow the use of reduced-cost, compact heat exchangers and turbomachinery components while avoiding crystallization challenges in LiBr-water systems.

Figure 19:
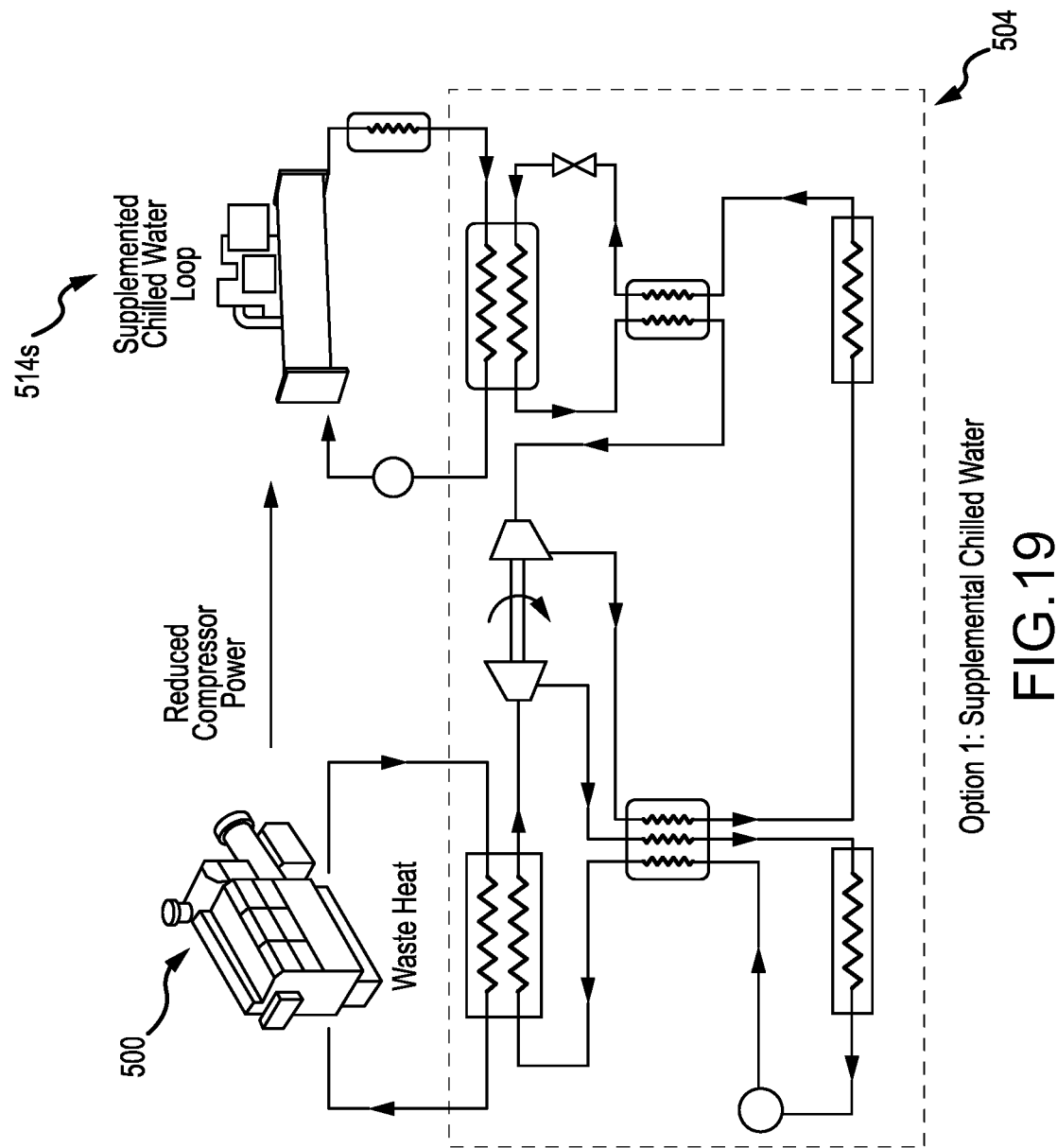
FIG. 19 is a diagrammatic view of a turbo-compression cooling system utilizing waste heat from a diesel generator, and providing supplemental chilled water.
Figure 20:
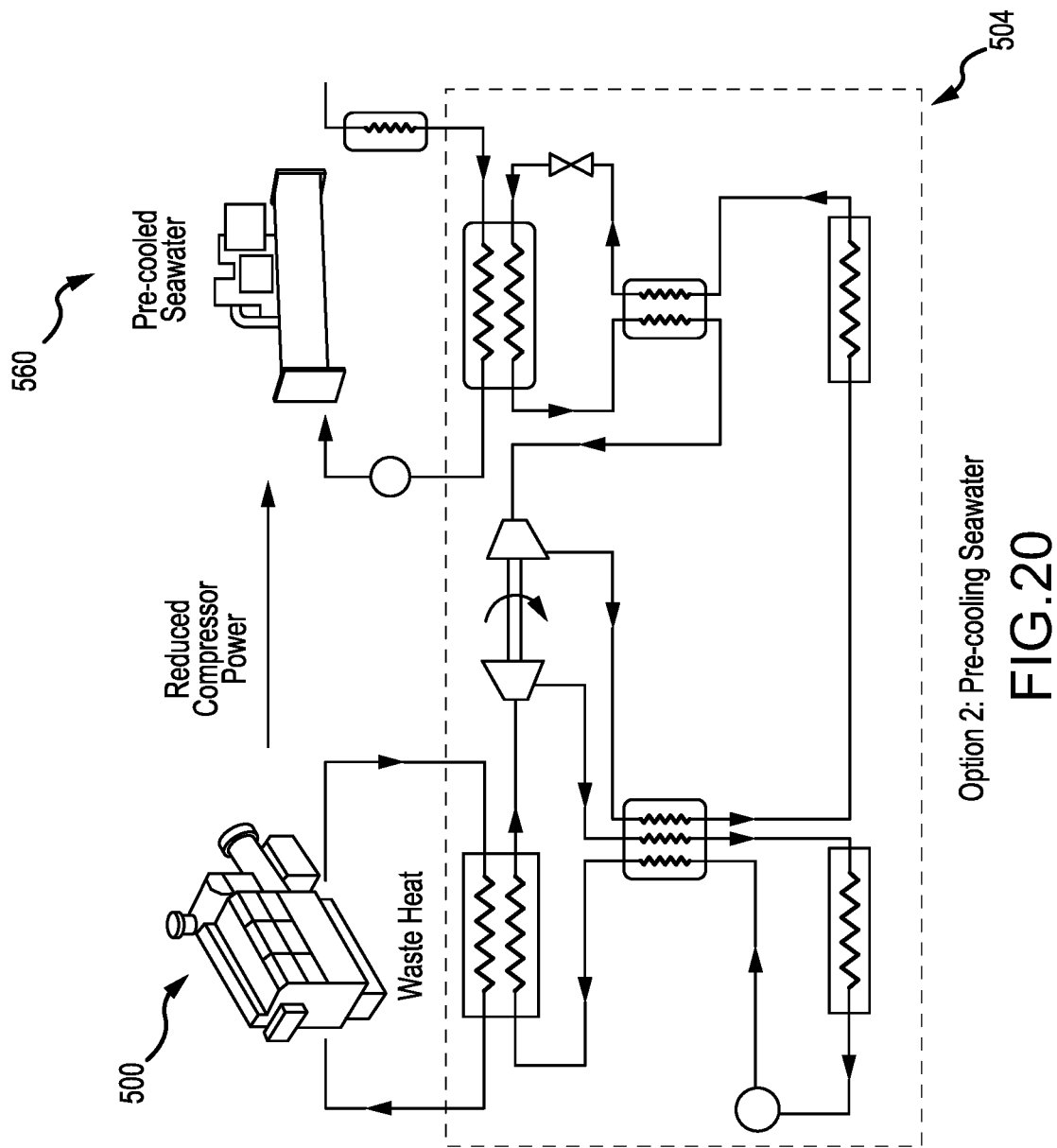
FIG. 20 is a diagrammatic view of a turbo-compression cooling system utilizing waste heat from a diesel generator, and providing pre-cooled seawater for use by the shipboard chillers.
Figure 21:
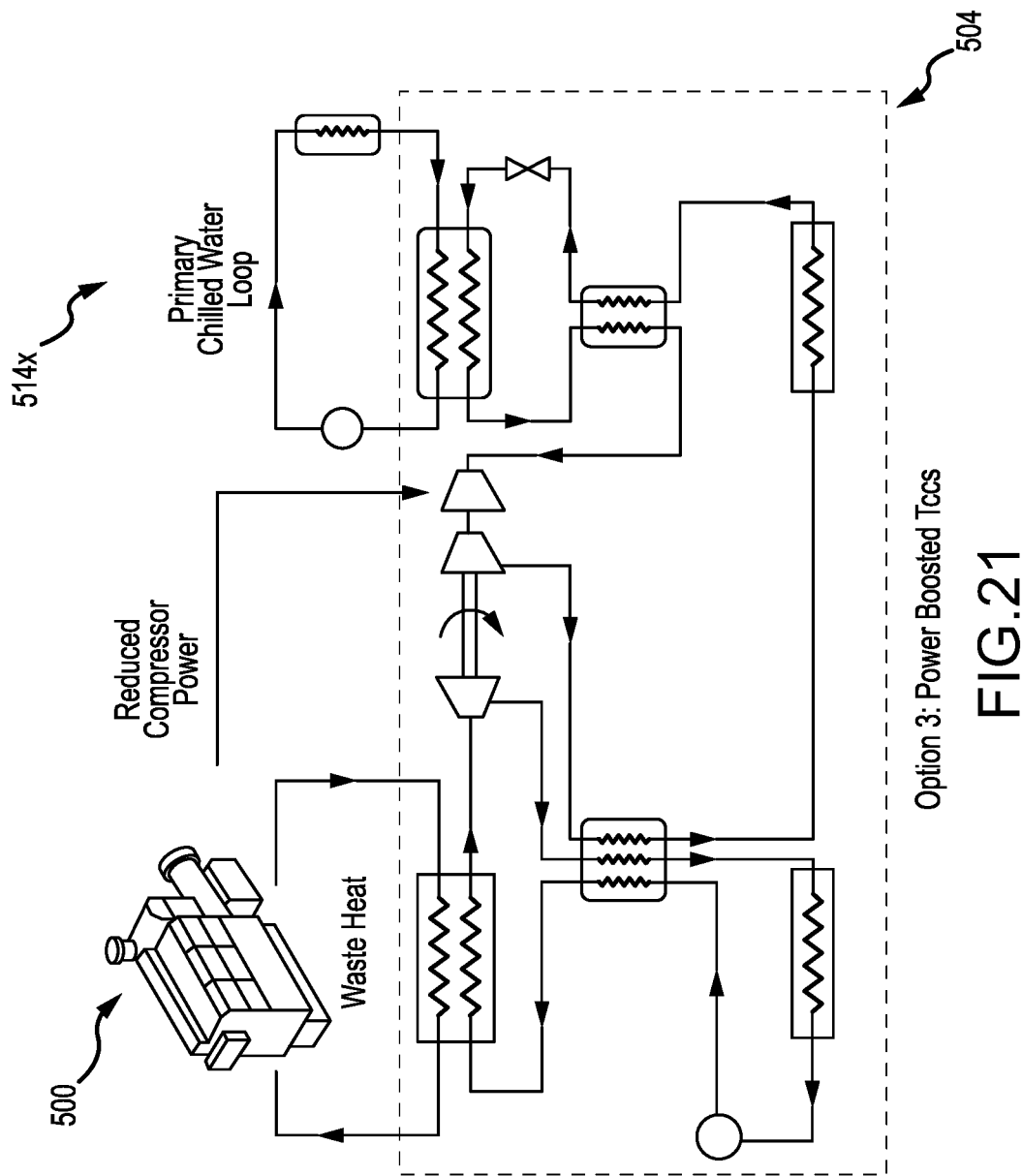
FIG. 21 is a diagrammatic view of a turbo-compression cooling system utilizing waste heat from a diesel generator, and replacing the shipboard chilling units, with a power boosted vapor compression chiller.

The magnitude of fuel efficiency increase from using waste heat to power the TCCS depends on how the cooling is used on the ship. Three options for utilization of the waste heat are shown in FIGS. 19, 20, and 21. One option, shown in FIG. 19, utilizes ultra-low grade waste heat from the DG 500 and generates supplemental chilled water (via a supplemental vapor compression chiller 514s) in a turbo-compression cooling system 504 (which is described more fully with respect to FIG. 12), which offsets the load from the electrically-driven shipboard vapor compression chillers 514. Another option, shown in FIG. 20, aims to reduce the seawater inlet temperature to the shipboard chillers 514 to improve the coefficient of performance of the existing vapor compression units. In this system, heat will be removed from the ambient seawater in a chilling heat exchanger 560 on the turbo-compression cooling system 504 (which is described more fully in reference to FIG. 12), and the lower temperature seawater exiting the chilling heat exchanger 560 will be sent to the condensing heat exchanger on the vapor compression chillers 514 (not shown in FIG. 20, but illustrated generally in the diagrammatic view of FIG. 11). Another option, shown in FIG. 21, is to completely remove the shipboard chiller 514 (not shown) and replace it with a power boosted vapor compression chiller 514x. The power boosted vapor compression chiller 514x may use two compressors in tandem: one of the compressors will be driven by waste heat in a turbo-compression cooling system, while the second compressor will be driven by electricity from the diesel genset. Note the TCCS 504 shown in FIGS. 18-20 is the same TCCS 504 shown and described in greater detail with reference to FIG. 12, except for the modifications to the TCCS 504 described in reference to the additional compressor in the TCCS 504 utilizing a power boosted vapor compression chiller 514x of FIG. 21.

Still referring to FIG. 21, the overall electric power requirement to generate an equivalent amount of cooling will be significantly reduced by using two compressors, one heat driven and the other electrically driven. The three options in FIGS. 18-20 all feature high efficiency turbomachinery with advanced heat integration using recuperative heat exchangers. All of the heat exchangers on these cycles can be designed to be compact, brazed plate-fin devices to minimize the weight and volumetric footprint.

Mathematical simulations using average engine loading conditions (57% load) for waste heat data without recovering waste heat from the aftercooler air are as follows. With approximately 575 kW of waste heat input at an inlet temperature of 101° C. The ambient seawater temperature has a large impact on the system performance and the temperature changes as the ship travels throughout its operating locations. The performance was determined for each ambient seawater temperature and then provided a relative weight based on the amount of days the ship would operate in that temperature. Since seawater temperature varies throughout the world, typical annual temperature distributions coupled with engine capacity factors can be used to optimize system performance.

For the purposes of these sample calculations, it is assumed a ship in the open ocean experience 29° C. seawater temperature most often, approximately 55 days of the year. Thus, the thermodynamic performance of each option will be weighted most heavily when the ambient seawater temperature is 29° C. The results of the modeling efforts with only utilizing lubricating oil and jacket water heat in the TCCS are summarized below and in the table in FIG. 22. Prior to developing thermodynamic models for each of the options, it was important to accurately model the performance of the current shipboard chillers. A thermodynamic cycle model was developed and validated for a single 200-ton shipboard chiller. A parametric study was performed to quantify the performance impact of varying seawater ambient temperature. The yearly weighted average COP (electric to cooling) for the shipboard chillers was calculated to be 3.86, with an annual average weighted compressor power draw of 144 kW. Having an accurate model for the shipboard chillers is important to quantifying the efficiency gains from each option.

The option in FIG. 19 utilizes waste heat to generate supplemental chilled water (12° C. inlet and 7° C. outlet) to reduce electricity consumption from the shipboard vapor compression chillers 514. The results of the mathematical simulations of this option can be seen in the top spreadsheet on the right column of FIG. 22. The yearly weighted average (based on the seawater temperature profile) cooling duty for Option 1 was 471 kW, yielding a waste heat to cooling COP of 0.806. Based on the COP of the currently in operation shipboard chillers 514, generating 471 kW of cooling would require 122 kW of electric compressor power. Subtracting the electric power required by the power cycle pump on the TCCS 504 will yield a weighted electric power reduction of 111 kW, which translates to a 7.8% increase in total shipboard system efficiency by capturing the ultra-low temperature waste heat provided by the TCCS 504.

The option in FIG. 20 precools the condensing seawater using the turbo-compression cooling system 504. The results of the mathematical simulations of this option can be seen in the middle spreadsheet on the right column of FIG. 22. In this system, the condenser inlet temperature and "chilled" water inlet temperature are the same, since it is designed to cool the ambient water temperature before it is pumped to the shipboard chillers 514. This system could reduce the cooling water inlet temperature by 10.3° C., as a weighted average throughout the year, which improved the annual weighted average COP from 3.86 to 5.73. The improved COP of the shipboard chiller translates to a net reduction of electric power consumption per engine of 54 kW, which is a 3.8% improvement in overall system efficiency. Although this option presents the smallest improvement in total system efficiency, the aftercooler air may be further chilled to improve the diesel engine efficiency.

The option in FIG. 21 completely replaces the shipboard chillers 514 by utilizing low-grade waste heat coupled with a small fraction of electricity. The results of the mathematical simulations of this option can be seen in the bottom spreadsheet on the right column of FIG. 22. The power boosted TCCS 504 has two compressors: the first is driven by mechanical work from the heat driven power cycle and the second compressor is driven by electricity from the DG. This system produces chilled water at standard temperatures (12° C. inlet and 7° C. outlet) for space conditioning. The power boosted TCCS can provide 737 kW of cooling as a weighted average throughout the year. The total amount of compression work that must be input to the cooling cycle is 113 kW. The total compression work is split between heat activated mechanical power and electrically activated power, which are 75.2 kW and 37.3 kW, respectively. To produce an equivalent amount of cooling (737 kW), the shipboard chillers would consume 191 kW of electricity. Accounting for the power draw of the power cycle pump, the net reduction in electricity consumption for the option in FIG. 21 is 146 kW, a 10.2% improvement in total system efficiency, the highest improvement of the three options.

Figure 9:
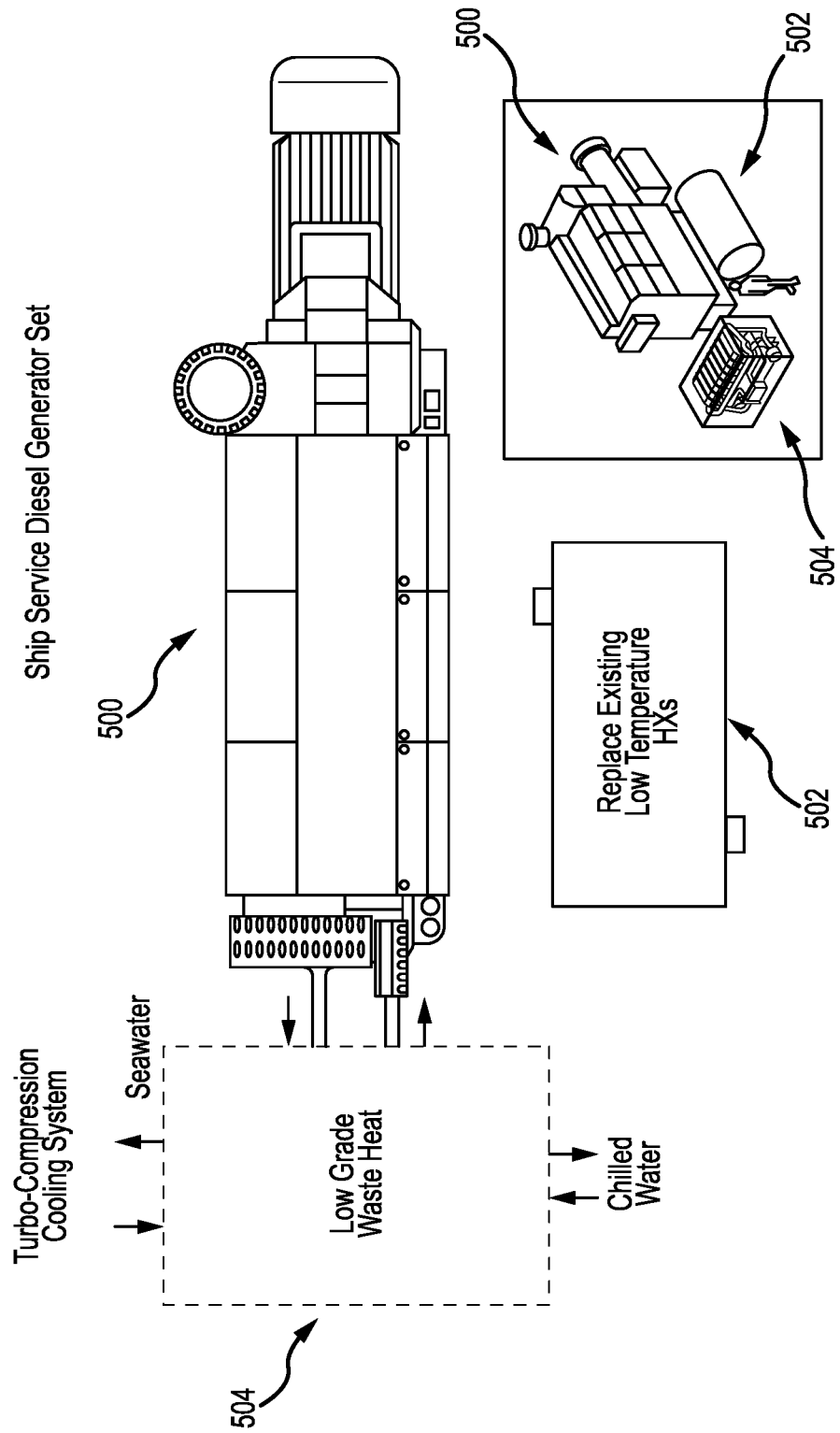
FIG. 9A is a top view of a diesel generator integrated with a turbo-compression cooling system.
FIG. 9B is an isometric view of a diesel generator integrated with a turbo-compression cooling system.

Preliminary sizes of the three systems shown in FIGS. 18-20 can be seen in FIGS. 9A-9B and by the tables on the right column of FIG. 22. For the TCCS 504 shown in FIGS. 18 and 19, the volumetric footprint will be 6.0 m³. For the TCCS 504 shown in FIG. 21, the heat duty in the chiller and cooling cycle condensers will increase slightly, but, because the heat exchangers are compact, this system will at most occupy an additional 7.5 m³. In all instances, it is anticipated that the large low temperature seawater heat exchangers 502, as illustrated in FIGS. 9A and 9B, can be replaced by the TCCS 504. Thus, the net increase in volume for embodiments shown in FIGS. 18 and 19 will be less than 5%. For the embodiment of FIG. 21, the large electric chillers can also be replaced because the embedded electric compressor in the power boosted TCCS 504 can be operated without the need for waste heat during extreme events. Thus, redundancy is already built-in. Therefore, because the relatively inefficient existing chillers are replaced by the highly efficient, compact power boosted TCCS, there is a potential total volume decrease of 21.2% for the embodiment in FIG. 21 in concert with a greater than 10% fuel efficiency improvement.

III. Industrial Systems and Turbo-Compression Cooling System

Waste heat from industrial processes is significant and represents an opportunity to improve energy efficiency of manufacturing processes. For example, waste heat from ultra-low temperatures from jacket cooling water engines (about 90° C.) and waste heat from steam boilers (about 150° C.) are available and largely untapped recovery streams. Thus, the following systems are generally applicable to a wide variety of industrial processes and/or manufacturing environments. In addition, while the previous sections of this application described specific processes for specific applications (e.g., marine diesel generators), the turbo-compression cooling systems described in those section are equally applicable to more generalized industrial processes and/or manufacturing environments. In addition, while each system is discreetly described in this application, it is to be understood that features from one system may be applied to the other systems described herein without limitation. Each system embodiment is merely illustrative of an example embodiment and is not intended to be limited to its specific illustration.

Figure 23:
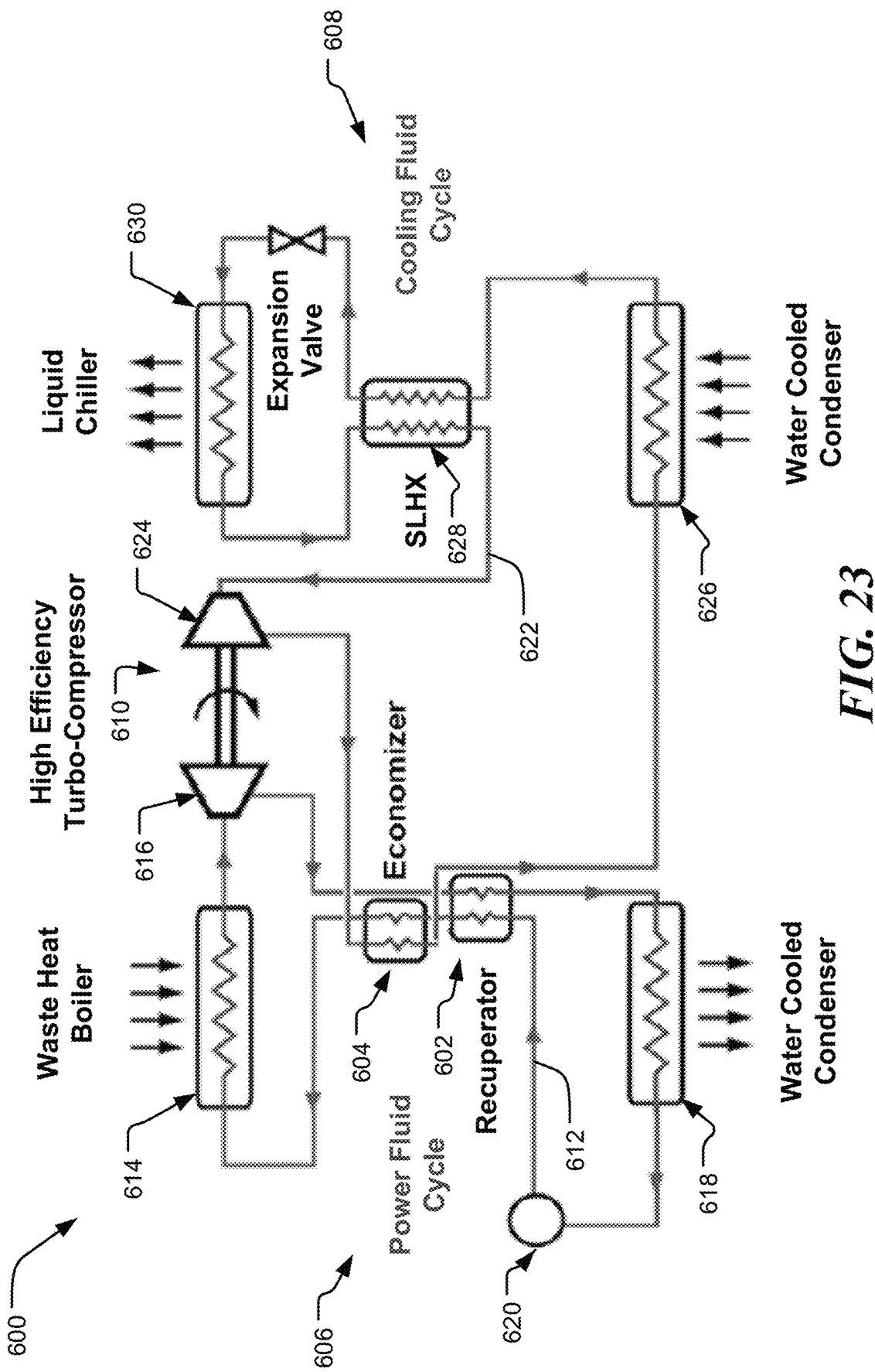
FIG. 23 is a diagrammatic view of a turbo-compression cooling system utilizing an economizer and a recuperator in accordance with the present disclosure.

To begin, reference is made to FIG. 23, which is a diagrammatic view of a turbo-compressor cooling system 600 ("TCCS") that utilizes ultra-low temperature waste heat from an industrial process in order to generate cooling. This system 600 is similar to the system 504 shown in FIG. 12, except the three-fluid recuperator 526 is replaced with a two-fluid recuperator 602 and an economizer 604. As seen in FIG. 23, the system 600 includes a power cycle 606 and a cooling cycle 608 that are coupled together via a turbo-compressor 610. The recuperator 602 and economizer 604 are both heat exchangers that pre-heat the fluid 612 in the power cycle 606 prior to the fluid 612 entering the waste heat boiler 614. The recuperator 602 is a heat exchanger with a first passage for the heated fluid 612 exiting the turbine 616 to pre-heat the fluid 612 that has entered the recuperator 602 through a second passageway after being passed through the condenser 618. Upon being cooled by the condenser 618, the fluid 612 is pumped via a pump 620 through the second passageway of the recuperator 602 and towards the waste heat boiler 614. Before entering the waste heat boiler 614, the fluid 612 is pre-heated a second time by the economizer 604. More particularly, the economizer 604 has a first passage for the cooling cycle fluid 622 that enters directly after discharge from the compressor 624, and a second passage for the power cycle fluid 612 to pass through. The cooling cycle fluid 622 is hotter than the power cycle fluid 612 at this stage of the cycles and thus heat is transferred to the power cycle fluid 612 to pre-heat the fluid 612 prior to entering the waste heat boiler 614.

The waste heat boiler 614 receives ultra-low temperature waste heat from an industrial process and thus heats the power cycle fluid 612 prior to the fluid 612 entering the turbine 616. As stated previously, the waste heat boiler 614 may receive heat from engine jacket coolant and/or steam boilers, among other equipment in the facility.

Turning to the cooling cycle 608, the fluid 622 leaving the economizer 604 enters the condenser 626, which may be a water-cooled condenser. The fluid 622 may then enter a first passage of a suction-line heat exchanger ("SLHX") 628. The fluid 622 in the first passage pre-heats the fluid 622 passing through a second passage of the SLHX 628 prior to that fluid 622 entering the compressor 624. Once the cooling fluid 622 is liquefied in the condenser 626 and the SLHX 628, it is expanded to low pressure and passed into an evaporator 630, where the cooling effect is generated. The evaporator 630 may be used in a cooling process within the facility such as, for example, chilling water or another substance. Superheated vapor 622 exiting the evaporator 630 passes through the second passageway and is heated by the SLHX 542. This also pre-cools the fluid 622 in the first passageway of the SLHX 628, which reduces the inlet enthalpy in the evaporator 630 and substantially improves the performance of the cooling cycle 608. Incorporation of a SLHX 628 can also improve operational stability of the cooling cycle 608 by preventing liquid droplets from entering the compressor 624.

Figure 24:
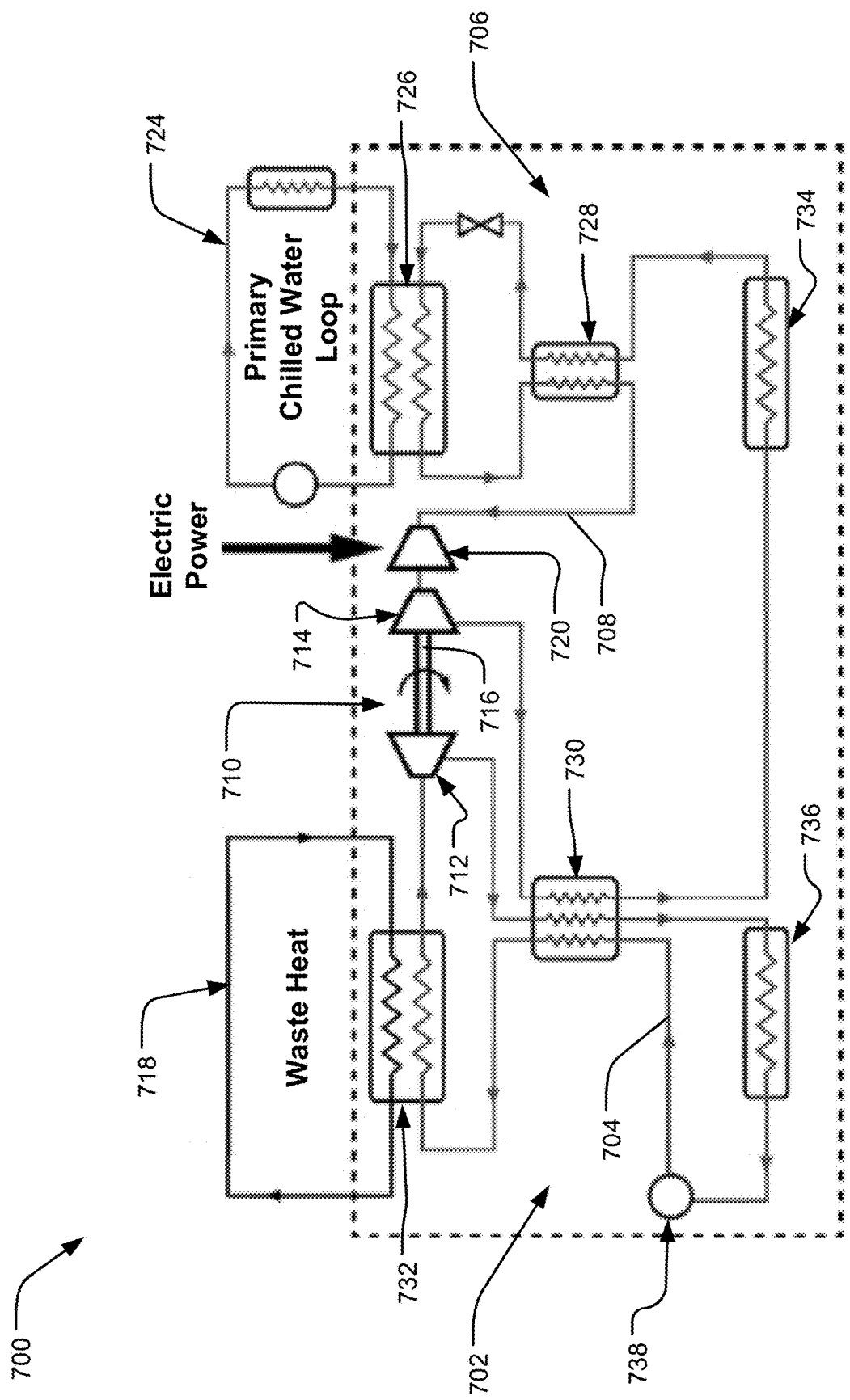
FIG. 24 is a diagrammatic view of a turbo-compression cooling system utilizing a power-boosted compressor on the cooling cycle side thereof.

FIG. 24 illustrates a diagrammatic view of a power-boosted turbo-compressor system 700, which is similar to the system described with reference to FIG. 21. The system 700 shown in FIG. 24 will be described more generally and applicable for use with any system seeking waste heat recovery. The system 700 includes a power cycle 702 circulating a power cycle fluid 704, a cooling cycle 706 circulating a cooling cycle fluid 708, and a turbo-compressor 710 linking the two cycles 702, 706. The turbo-compressor 710 includes a turbine 712 on the power cycle side, a first compressor 714 on the cooling cycle side, and a shaft 716 coupling the two together.

On the cooling cycle 706 side, a second compressor 720 may be included in the system 700, pre-compressing the fluid 708 right before it is received by the first compressor 714. The second compressor 720 may be electrically powered, whereas the first compressor 714 is powered by the operation of the power cycle 702. More particularly, the power cycle 702 is powered by a waste heat stream 718 from a co-located industrial process. The waste heat stream 718 may be an ultra-low temperature stream of waste heat including engine jacket cooling water and lubricating oil (e.g., generator). The heated power cycle fluid 704 is used to power the turbine 712 of the turbo-compressor 710, which powers the first compressor 714. The second compressor 720 is powered with electricity to increase the efficiency of the system 700. In this way, the cooling cycle 706 operates two compressors 714, 720, which eliminates surging of the compressor 714 while still cooling primary chilled water 724 to the same inlet and outlet temperature when the availability of waste heat 714 decreases.

Referring back to FIG. 24, the cooling cycle 706 may provide cooling to a cooling loop 724 within the industrial facility. The cooling loop 724 may be used to provide cold water or space cooling to the facility, among other uses. The cooling cycle 706 may generally include an evaporator 726, which provides cooling for the cooling loop 724. The discharge from the evaporator 726 may enter a first passage of a suction-line heat exchanger ("SLHX") 728, and the incoming stream of cooling cycle fluid 708 to the evaporator 726 may exit a second passage of the SLHX. After discharging from the evaporator 726 and the SLHX 728, the cooling cycle fluid 708 is received by the second, electrically powered compressor 720 and is pre-compressed before entering into the first compressor 714. The compressor 714 discharges the heated cooling cycle fluid 708 to a three-fluid recuperator 730 to pre-heat the power cycle fluid 704 prior to entering the waste heat boiler 732. Upon exiting the recuperator 730, the cooling cycle fluid 708 enters a condenser 734 before entering the second passage of the SLHX 726.

The recuperator 730 additionally facilitates pre-heating of the power cycle fluid 704 by the discharge line coming off the turbine 712 passing through the recuperator 730 prior to entering the condenser 736. After passing through the condenser 736, the fluid 704 is pumped via a pump 738 back through the recuperator 730 and to the waste heat boiler 732 before entering the turbine 712. It is noted that the condensers 736, 734 in this embodiment, and others, may be combined into a single condenser. Moreover, in embodiments with the same cycle fluid 704, 708, the fluids may be mixed at certain points throughout the system 700.

With the system 700 shown in FIG. 24, the total compression work is split between heat activated mechanical power (first compressor 714) and electrically activated power (second compressor 720). The overall electric power requirement to generate an equivalent amount of cooling is significantly reduced by using two compressors, one heat driven and the other electrically driven. The overall system 700 operates efficiently in this configuration such that the electrical requirements of an additional compressor are more than offset by the total system gains in efficiency.

Figure 25:
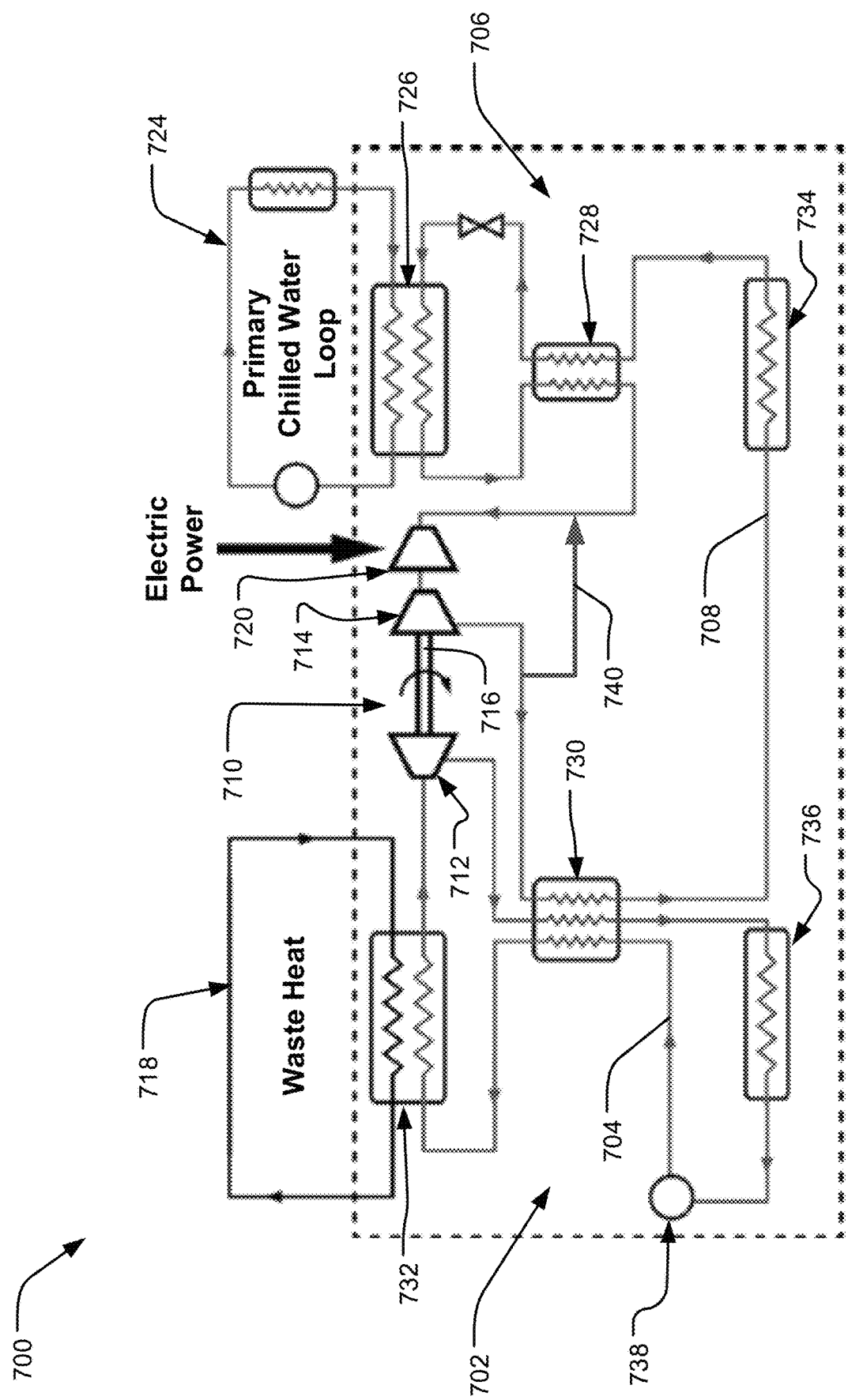
FIG. 25 is a diagrammatic view of a turbo-compression cooling system as in FIG. 24, except with a compressor bypass line.

FIG. 25 illustrates a diagrammatic view of the power-boosted turbo-compression cooling system 700 of FIG. 24, but with a compressor bypass line 740. In this instance, a portion of the cooling cycle fluid 708, at discharge from the first compressor 714, re-routed to the SLHX 728 discharge line that is routed to the compressor 720. This configuration provides additional heating to the cooling cycle fluid 708 entering the compressors 720, 714 in order to increase the overall efficiency of the system by avoiding compressor surge.

It is noted that elements of the systems shown and described with references to FIGS. 23-25 may be modified according to the teaching of the present disclosure. For instance, elements of the systems may be added, removed, and/or interchanged with elements of the other systems described herein without limitation. As such, the specific embodiments shown in the figures are not limiting; instead, the embodiments are merely illustrative of the teachings of the present disclosure.

Figure 26:
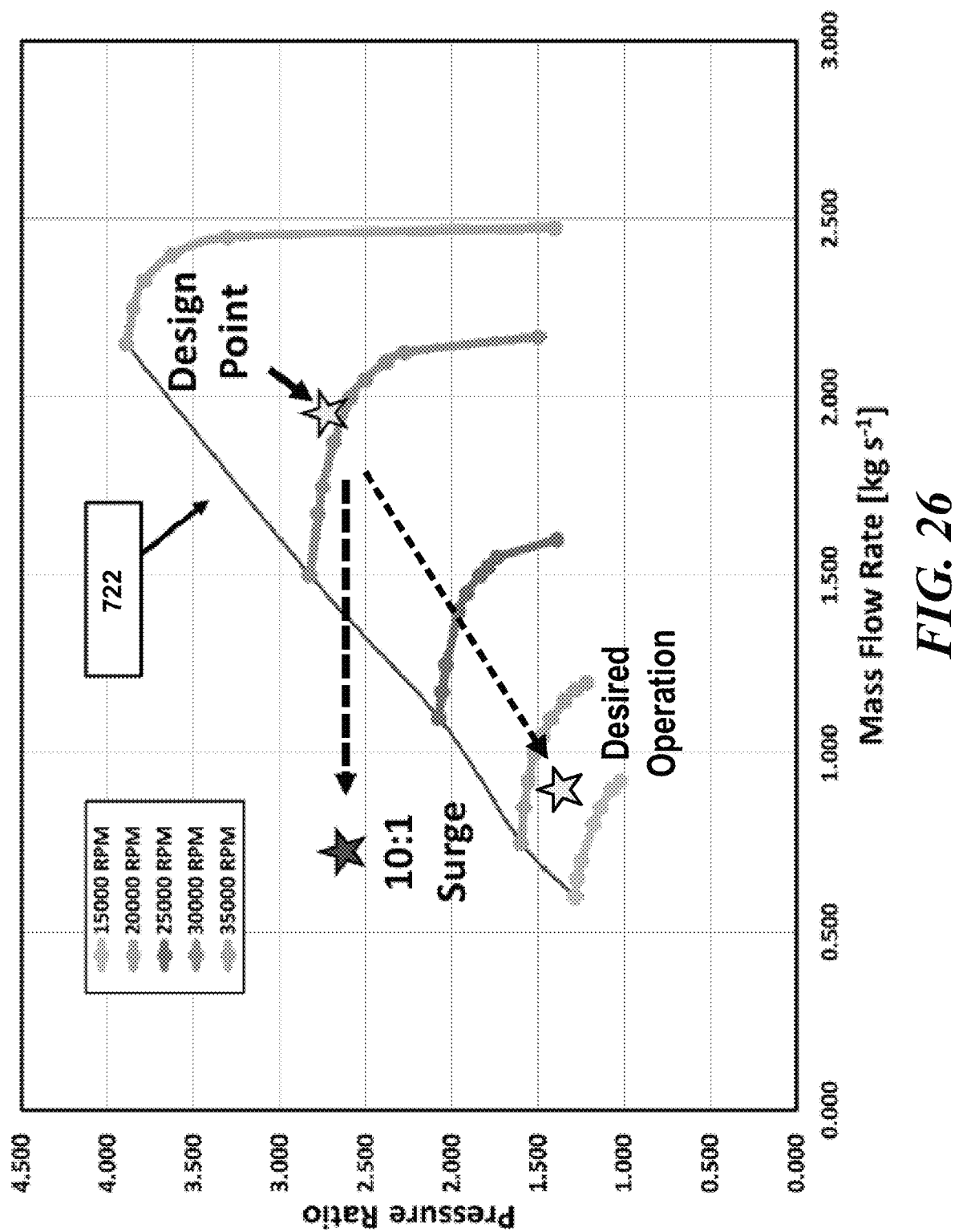
FIG. 26 is a compressor performance map.

FIG. 26 illustrates a compressor performance map of pressure ratio versus mass flow rate, with a surge line 722 associated with various curves of compressor 714 operating at different speeds (RPM). Avoiding compressor surge (crossing over of the surge line 722) is a major challenge of centrifugal machinery. In addition, since a compressor cannot operate at the same speed and under the same conditions (flow rate, pressures) at all times, avoiding the surge line 722 throughout the operational range of the device presents challenges in system design. For example, as seen in FIG. 25, at the "design point", if mass flow rate through the compressor were decreased while maintaining the pressure ratio, the compressor would surge. On the other hand, with the use of multiple compressors into the system 700, compressor 714 can operate to the right of the surge line 722 throughout all ranges of use.

The graph of FIG. 26 can be further explained as follows. As the amount of waste heat reduces, the amount of turbine power reduces; thus, the amount of compressor power reduces. However, the chilled water temperature must remain the same, which more or less fixes the required pressure ratio across the compressor (the condenser and evaporator saturation pressures must remain the same). Because the compressor power is reduced, the mass flow rate is reduced, and compressor 714 operates in the surge region to the left of line 722. The electrical compressor 720, of FIG. 25, boosts the inlet pressure into compressor 714. As a result, it can operate to the right of the surge line.

FIG. 27 shows a table of flow bypass, corrected mass flow rate, and corrected enthalpy rise of the system 700 of FIG. 25. The corrected mass flow accounts for the change in density into the compressor. As the density decreases, the corrected mass flow increases. Thus, the compressor operates to the right of the surge line 722 of FIG. 26. Bypassing the flow increases the temperature into compressor 714. This reduces the density and increases the corrected mass flow. It also decreases the corrected enthalpy rise. Both of these effects allow compressor 714 to operate to the right of the surge line 722.

It is believed the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

What is claimed is:

1. A system for turbo-compression cooling in a facility having a cooling loop, the system comprising:
    a power cycle comprising:
        a first working fluid;
        a waste heat boiler configured to evaporate the working fluid, the waste heat boiler configured to receive waste heat;
        a turbine configured to receive the evaporated first working fluid from the waste heat boiler, the turbine having a plurality of vanes disposed around a central shaft and configured to rotate about the central shaft, the plurality of vanes configured to rotate as the first working fluid expands to a lower pressure; and
        a first condenser configured to receive the first working fluid from the turbine and configured to condense the first working fluid to a saturated or subcooled liquid;
    a cooling cycle comprising:
        a second working fluid;
        a first compressor configured to increase the pressure of the second working fluid;
        a second condenser configured to receive the second working fluid from the first compressor and configured to condense the second working fluid to a saturated or subcooled liquid;
        an expansion valve configured to receive the second working fluid from the second condenser and configured to expand the second working fluid to a lower pressure;
        an evaporator configured to receive the second working fluid from the expansion valve and configured to reject heat from a circulating fluid to the second working fluid, thereby cooling the circulating fluid, the circulating fluid being water or a water-glycol mixture that is part of the cooling loop;
        an economizer configured to reject heat from the second working fluid exiting the first compressor and absorb heat in the first working fluid exiting the first condenser; and
    wherein the turbine and first compressor are coupled one to the other, thereby coupling the power cycle and the cooling cycle.

2. The system of claim 1, wherein the water in the cooling loop is seawater that cools shipboard chillers in a marine vessel.

3. The system of claim 1, wherein the cooling loop provides cooling within a marine vessel.

4. The system of claim 1, wherein the cooling cycle further comprises a second compressor.

5. The system of claim 4, wherein the second compressor is electrically powered.

6. The system of claim 5, wherein the first compressor is powered via the waste heat from the waste heat boiler.

7. The system of claim 1, wherein the first working fluid and the second working fluid are the same fluid.

8. The system of claim 1, wherein the power cycle and the first working fluid are hermetically sealed from the cooling cycle and the second working fluid.

9. The system of claim 1, wherein the turbine and the first compressor are magnetically coupled one to the other, and wherein the turbine has a first shaft and the first compressor has a second shaft, one of the first shaft and the second shaft disposed around at least a portion of the other of the first shaft and the second shaft, the first shaft having one or more first polarity magnetic elements and the second shaft having one or more second polarity magnetic elements, the first polarity and the second polarity being opposite and magnetically engaged with one another.

10. The system of claim 1, further comprising a recuperator configured to receive heat rejected by the first working fluid, and wherein the recuperator is configured to transfer the rejected heat to the saturated or subcooled liquid as the first working fluid re-enters the waste heat boiler.

11. A method of turbo-compression cooling, the method comprising:
    receiving, from a waste heat source, heat waste in a waste heat boiler;
    evaporating a first working fluid using the heat waste in the waste heat boiler;
    generating mechanical power through expansion of the first working fluid to a lower pressure in a turbine, the expansion of the first working fluid rotating one or more turbine vanes;
    condensing the first working fluid to a saturated or subcooled liquid in a first condenser;
    pressurizing the saturated or subcooled liquid through a mechanical pump to re-enter the waste heat boiler;
    transferring the generated mechanical power to a first compressor, the first compressor configured to receive a second working fluid;
    compressing the second working fluid via the first compressor thereby increasing the pressure thereof;
    condensing the second working fluid in a second condenser to a saturated or subcooled liquid;
    expanding the second working fluid to a lower pressure via an expansion valve;
    rejecting heat through an evaporator from circulating cooling fluid to the second working fluid;
    compressing the second working fluid via a second compressor powered separately from the first compressor; and
    discharging the second working fluid from the second compressor to the first compressor.

12. The method of claim 11, wherein the first working fluid and the second working fluid are the same fluid.

13. The method of claim 11, further comprising rejecting heat from the first working fluid exiting the turbine in a recuperator, and absorbing heat in the first working fluid exiting the mechanical pump in the recuperator.

14. The method of claim 13, further comprising recirculating a portion of the second working fluid exiting the first compressor to an inflow of the second compressor.

15. The method of claim 14, further comprising rejecting heat from the second working fluid in the recuperator.

16. The method of claim 11, further comprising preheating the second working fluid in a suction-line heat exchanger prior to compressing the second working fluid via the second compressor.

17. The method of claim 16, wherein the second working fluid is preheated via the second working fluid after discharge from the second condenser.

18. The method of claim 14, further comprising recirculating a portion of the second working fluid exiting the first compressor to an inflow of the first compressor.

19. The method of claim 11, wherein the second compressor is electrically powered.

20. The method of claim 11, further comprising rejecting heat from the second working fluid exiting the first compressor in an economizer, and absorbing heat in the first working fluid exiting the mechanical pump.

21. The method of claim 20, further comprising rejecting heat from the first working fluid exiting the turbine in a recuperator, and absorbing heat in the first working fluid exiting the mechanical pump.

22. A system for turbo-compression cooling powered with waste heat from a facility having a cooling loop, the system comprising:
a power cycle comprising:
a first working fluid;
a waste heat boiler configured to evaporate the first working fluid, the waste heat boiler configured to receive the waste heat from the facility;
a turbine configured to receive the evaporated first working fluid from the waste heat boiler, the turbine having a plurality of vanes disposed around a central shaft and configured to rotate about the central shaft, the plurality of vanes configured to rotate as the first working fluid expands to a lower pressure; and
a first condenser configured to receive the first working fluid from the turbine and configured to condense the first working fluid to a saturated or subcooled liquid;
a cooling cycle comprising:
a second working fluid;
a first compressor configured to increase the pressure of the second working fluid;
a second condenser configured to receive the second working fluid from the first compressor and configured to condense the second working fluid to a saturated or subcooled liquid;
an expansion valve configured to receive the second working fluid from the second condenser and configured to expand the second working fluid to a lower pressure;
an evaporator configured to receive the second working fluid from the expansion valve and configured to reject heat from a circulating fluid to the second working fluid, thereby cooling the circulating fluid;
an economizer configured to reject heat from the second working fluid exiting the first compressor and absorb heat in the first working fluid exiting the first condenser; and
wherein the turbine and first compressor are coupled one to the other, thereby coupling the power cycle and the cooling cycle.

23. The system of claim 22, wherein the circulating fluid is ammonia, the cooling loop being an ammonia-cooling loop.

24. The system of claim 23, wherein the ammonia is precooled between a receiver of the ammonia-cooling loop and an accumulator of the ammonia-cooling loop.

25. The system of claim 24, wherein the ammonia is precooled between the receiver of the ammonia-cooling loop and an expansion valve of the ammonia-cooling loop.

26. The system of claim 23, wherein the ammonia is precooled between a cold box of the ammonia cooling loop and an accumulator of the ammonia cooling loop.

27. The system of claim 23, wherein the ammonia is cooled from about 27° C. to about 6.5° C.

28. A system for turbo-compression cooling in a distributed refrigeration system in a facility producing waste heat, the distributed refrigeration system comprising an accumulator receiving a two-phase mixture of a refrigerant from an expansion valve, wherein the refrigerant in a liquid state from the accumulator is repressurized and sent to a distributed set of evaporators, the system comprising:
a power cycle comprising:
a power cycle fluid;
a waste heat boiler configured to evaporate the power cycle fluid, the waste heat boiler configured to receive waste heat from the facility;
a turbine configured to receive the evaporated power cycle fluid from the waste heat boiler, the turbine having a plurality of vanes disposed around a central shaft and configured to rotate about the central shaft, the plurality of vanes configured to rotate as the power cycle fluid expands to a lower pressure; and
a first condenser configured to receive the power cycle fluid from the turbine, and configured to condense the power cycle fluid to a saturated or subcooled liquid;
a cooling cycle comprising:
a cooling cycle fluid;
a first compressor configured to increase the pressure of the cooling cycle fluid, the first compressor coupled to the turbine, thereby coupling the power cycle and the cooling cycle;
a second condenser configured to receive the cooling cycle fluid from the first compressor and configured to condense the cooling cycle fluid to a saturated or subcooled liquid;
an expansion valve configured to receive the cooling cycle fluid from the second condenser and configured to expand the cooling cycle fluid a lower pressure upon passing therethrough;
an evaporator configured to receive the cooling cycle fluid from the expansion valve and being integrated with the refrigerant of the distributed refrigeration system to provide cooling to the refrigerant, the refrigerant rejecting heat to the cooling cycle fluid;
an economizer configured to reject heat from the cooling cycle fluid exiting the first compressor and absorb heat in the power cycle fluid exiting the first condenser.

29. The system of claim 28, wherein the refrigerant is cooled prior to entering the expansion valve.

30. The system of claim 29, wherein the refrigerant is cooled after exiting a receiver of the distributed refrigeration system.

31. The system of claim 28, wherein the refrigerant is ammonia.

32. The system of claim 31, wherein the refrigerant is cooled from about 27 degrees Celsius to about 6.5 degrees Celsius.

33. The system of claim 31, wherein the refrigerant is cooled about 20.5 degrees Celsius.

34. The system of claim 28, wherein cooling of the refrigerant via the evaporator of the cooling cycle decreases vapor percentage of the two-phase mixture of the refrigerant received in the accumulator.

35. The system of claim 28, wherein the refrigerant is precooled between a cold box of the distributed refrigeration system and the accumulator.

36. The system of claim 28, wherein the refrigerant is one of a hydrocarbon, carbon dioxide, a hydrofluorocarbon, a hydrofluoroether, and a hydrofluoroolefin.

37. A method of turbo-compression cooling, the method comprising:
receiving, from a waste heat source, heat waste in a waste heat boiler;
evaporating a first working fluid using the heat waste in the waste heat boiler;
generating mechanical power through expansion of the first working fluid to a lower pressure in a turbine, the expansion of the first working fluid rotating one or more turbine vanes;

condensing the first working fluid to a saturated or subcooled liquid in a first condenser;

pressurizing the saturated or subcooled liquid through a mechanical pump to re-enter the waste heat boiler;

transferring the generated mechanical power to a compressor, the compressor configured to receive a second working fluid;

compressing the second working fluid via the compressor thereby increasing the pressure thereof;

condensing the second working fluid in a second condenser to a saturated or subcooled liquid;

expanding the second working fluid to a lower pressure via an expansion valve;

rejecting heat through an evaporator from circulating cooling fluid to the second working fluid; and rejecting heat from the second working fluid exiting the compressor in an economizer, and absorbing heat in the first working fluid exiting the mechanical pump in the economizer.

38. The method of claim 37, wherein the first working fluid and the second working fluid are the same fluid.

39. The method of claim 37, further comprising rejecting heat from the first working fluid exiting the turbine in a recuperator, and absorbing heat in the first working fluid exiting the mechanical pump in the recuperator.

40. The method of claim 39, further comprising rejecting heat from the second working fluid in the recuperator.

41. The method of claim 40, further comprising recirculating a portion of the second working fluid exiting the compressor.

42. The method of claim 37, further comprising preheating the second working fluid in a suction-line heat exchanger prior to compressing the second working fluid via the compressor.

43. A method of turbo-compression cooling, the method comprising:
   receiving, from a waste heat source, heat waste in a waste heat boiler;
   evaporating a first working fluid using the heat waste in the waste heat boiler;
   generating mechanical power through expansion of the first working fluid to a lower pressure in a turbine, the expansion of the first working fluid rotating one or more turbine vanes;
   condensing the first working fluid to a saturated or subcooled liquid in a first condenser;
   pressurizing the saturated or subcooled liquid through a mechanical pump to re-enter the waste heat boiler;
   transferring the generated mechanical power to a compressor, the compressor configured to receive a second working fluid;
   compressing the second working fluid via the compressor thereby increasing the pressure thereof;
   condensing the second working fluid in a second condenser to a saturated or subcooled liquid;
   expanding the second working fluid to a lower pressure via an expansion valve;
   rejecting heat through an evaporator from circulating cooling fluid to the second working fluid; and
   preheating the second working fluid in a suction-line heat exchanger prior to compressing the second working fluid via the compressor, wherein the second working fluid is preheated in the suction-line heat exchanger via the second working fluid exiting the second condenser.

44. The method of claim 43, wherein the first working fluid and the second working fluid are the same fluid.

45. The method of claim 43, further comprising rejecting heat from the first working fluid exiting the turbine in a recuperator, and absorbing heat in the first working fluid exiting the mechanical pump in the recuperator.

46. The method of claim 45, further comprising rejecting heat from the second working fluid in the recuperator.

47. The method of claim 43, further comprising rejecting heat from the second working fluid exiting the compressor in an economizer, and absorbing heat in the first working fluid exiting the mechanical pump.

48. The method of claim 47, further comprising recirculating a portion of the second working fluid exiting the compressor.

49. The system of claim 1, further comprising a generator having a plurality of waste heat streams, wherein the waste heat boiler is configured to receive the waste heat from one or more of the plurality of waste heat streams from the generator.

50. The system of claim 49, wherein the plurality of waste heat streams includes engine jacket water, lubrication oil, aftercooler air, and exhaust gas.

51. The system of claim 1, wherein the power cycle further comprises a mechanical pump configured to pressurize the saturated or subcooled liquid to re-enter the waste heat boiler, wherein the economizer is configured to absorb heat in the first working fluid exiting the mechanical pump.

52. The system of claim 5, wherein the second compressor is configured to discharge the second working fluid to the first compressor.

53. The system of claim 22, wherein the power cycle further comprises a mechanical pump configured to pressurize the saturated or subcooled liquid to re-enter the waste heat boiler, wherein the economizer is configured to absorb heat in the first working fluid exiting the mechanical pump.

54. The system of claim 28, wherein the power cycle further comprises a mechanical pump configured to pressurize the saturated or subcooled liquid to re-enter the waste heat boiler, wherein the economizer is configured to absorb heat in the power cycle fluid exiting the mechanical pump.

55. The method of claim 47, further comprising rejecting heat from the first working fluid exiting the turbine in a recuperator, and absorbing heat in the first working fluid exiting the mechanical pump.

* * * * *

UNITED STATES PATENT AND TRADEMARK OFFICE
CERTIFICATE OF CORRECTION

| | |
|---|---|
| PATENT NO. | : 11,466,907 B2 |
| APPLICATION NO. | : 17/104479 |
| DATED | : October 11, 2022 |
| INVENTOR(S) | : Todd M. Bandhauer et al. |

It is certified that error appears in the above-identified patent and that said Letters Patent is hereby corrected as shown below:

In the Specification

In Column 1, Line 14, the Government Rights clause should read as follows:
This invention was made with government support under grant DE-AR0000574 and grant DE-EE0008325 awarded by the Department of Energy, and grant N68335-19-C-0493 awarded by the Department of Defense. The government has certain rights in the invention.

Signed and Sealed this
Seventh Day of January, 2025

Derrick Brent
*Acting Director of the United States Patent and Trademark Office*